US011929986B1

(12) United States Patent
Igram et al.

(10) Patent No.: US 11,929,986 B1
(45) Date of Patent: Mar. 12, 2024

(54) TWO-WAY DATA SHARING BETWEEN PRIVATE AND PUBLIC CLOUDS

(71) Applicant: Snowflake Inc., Bozeman, MT (US)

(72) Inventors: Khondokar Sami Igram, Burlingame, CA (US); Laxman Mamidi, Redwood City, CA (US); Sanjay Srivastava, Mountain View, CA (US); Chieh-Sheng Wang, San Mateo, CA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/325,388

(22) Filed: May 30, 2023

Related U.S. Application Data

(60) Provisional application No. 63/381,673, filed on Oct. 31, 2022.

(51) Int. Cl.
*H04L 9/40* (2022.01)
*G06F 21/62* (2013.01)

(52) U.S. Cl.
CPC ...... *H04L 63/0263* (2013.01); *G06F 21/6218* (2013.01); *H04L 63/0272* (2013.01); *H04L 63/083* (2013.01)

(58) Field of Classification Search
CPC ............. H04L 63/0263; H04L 63/0272; H04L 63/083; G06F 21/6218
See application file for complete search history.

(56) References Cited

U.S. PATENT DOCUMENTS

| | | | | |
|---|---|---|---|---|
| 9,300,633 | B2 * | 3/2016 | Acharya | H04L 61/2575 |
| 9,755,903 | B2 * | 9/2017 | Masurekar | H04L 63/20 |
| 11,218,421 | B1 * | 1/2022 | Khan | H04L 41/122 |
| 2014/0040999 | A1 * | 2/2014 | Zhang | H04W 4/60 |
| | | | | 726/5 |
| 2014/0075021 | A1 * | 3/2014 | Revanuru | H04L 41/40 |
| | | | | 709/224 |

(Continued)

OTHER PUBLICATIONS

D. Tayouri; S. Hassidim; A. Smirnov; A. Shabtai, "Cybersecurity in Agile Cloud Computing—Cybersecurity Guidelines for Cloud Access," in Cybersecurity in Agile Cloud Computing—Cybersecurity Guidelines for Cloud Access , vol. No., pp. 1-36, Sep. 28, 2022. (Year: 2022).*

(Continued)

*Primary Examiner* — Kari L Schmidt
(74) *Attorney, Agent, or Firm* — Schwegman Lundberg & Woessner, P.A.

(57) ABSTRACT

Methods, systems, and computer programs are presented for enabling automated secure data sharing from a private cloud region to a public cloud region and vice versa. A cloud data platform confirms a relationship establishment procedure between a provider and a consumer is recorded with a cloud data platform, the provider being associated with a private cloud deployment and the consumer being associated with a public cloud deployment in a public region. The cloud data platform enables disabling of a firewall policy that is preventing data traffic between the private cloud deployment and the public cloud deployment and enables data sharing between the private cloud deployment and the public cloud deployment. The cloud data platform enables data sharing in a database of the cloud data platform.

30 Claims, 12 Drawing Sheets

(56) References Cited

U.S. PATENT DOCUMENTS

| | | | | |
|---|---|---|---|---|
| 2014/0280961 | A1* | 9/2014 | Martinez | H04L 41/40 709/226 |
| 2015/0143501 | A1* | 5/2015 | Cherukuri | H04L 63/0227 726/11 |
| 2015/0156065 | A1* | 6/2015 | Grandhe | H04L 41/5054 709/224 |
| 2016/0241596 | A1* | 8/2016 | Overby, Jr. | H04L 65/102 |
| 2016/0261639 | A1* | 9/2016 | Xu | H04L 63/20 |
| 2016/0352836 | A1* | 12/2016 | Kamalakantha | G06F 40/40 |
| 2016/0359829 | A1* | 12/2016 | Gulledge | H04L 63/0807 |
| 2017/0104755 | A1* | 4/2017 | Arregoces | H04L 67/10 |
| 2017/0163644 | A1* | 6/2017 | Horii | H04L 63/10 |
| 2017/0250951 | A1* | 8/2017 | Wang | H04L 41/0894 |
| 2017/0302673 | A1* | 10/2017 | Makhervaks | H04L 63/101 |
| 2018/0027006 | A1* | 1/2018 | Zimmermann | G06F 21/6218 726/11 |
| 2018/0034821 | A1* | 2/2018 | Basetty | H04L 63/101 |
| 2018/0234459 | A1* | 8/2018 | Kung | H04L 63/0263 |
| 2019/0312909 | A1* | 10/2019 | Kulkarni | H04L 63/20 |
| 2020/0137114 | A1* | 4/2020 | Bender | H04L 9/50 |
| 2020/0177548 | A1* | 6/2020 | Devarajan | H04L 63/0254 |
| 2021/0049035 | A1* | 2/2021 | Beyer | G06F 9/5077 |
| 2021/0176191 | A1* | 6/2021 | Pargaonkar | G06Q 10/06 |
| 2021/0385194 | A1* | 12/2021 | Kulkarni | H04L 63/0263 |
| 2022/0086189 | A1* | 3/2022 | Nguyen | H04L 41/0894 |
| 2022/0360602 | A1* | 11/2022 | Rose | H04L 63/1433 |
| 2023/0133945 | A1* | 5/2023 | Park | G06F 16/2315 707/625 |

OTHER PUBLICATIONS

R. Mendes, T. Oliveira, V. Cogo, N. Neves and A. Bessani, "Charon: A Secure Cloud-of-Clouds System for Storing and Sharing Big Data," in IEEE Transactions on Cloud Computing, vol. 9, No. 4, pp. 1349-1361, 1 Oct.-Dec. 2021. (Year: 2021).*

* cited by examiner

TWO-WAY DATA SHARING BETWEEN PRIVATE AND PUBLIC CLOUDS

CROSS-REFERENCE TO RELATED APPLICATIONS

The present application claims benefit of earlier filing date and right of priority to U.S. Provisional Patent Application Ser. No. 63/381,673, filed on Oct. 31, 2022, entitled, "Automating Secured Data Sharing From Virtual Private Cloud-Public And Vice-Versa," the contents of which are hereby incorporated by reference herein in its entirety.

BACKGROUND

Network-based database systems can be provided through a cloud data platform, which allows organizations, customers, and users to store, manage, and retrieve data from the cloud. Cloud data platforms are widely used for data storage and data access in computing and communication contexts. With respect to architecture, a cloud data platform could be an on-premises data platform, a network-based data platform (e.g., a cloud-based data platform), another type of architecture, or some combination thereof. With respect to type of data processing, a cloud data platform could implement online analytical processing (OLAP), online transactional processing (OLTP), a combination of the two, another type of data processing, or some combination thereof. Moreover, a cloud data platform could be or include a relational database management system (RDBMS) or one or more other types of database management systems.

In an implementation of a cloud data platform, a given database (e.g., a database maintained for a customer account) can reside as an object within (e.g., a customer account) that can also include one or more other objects (e.g., users, roles, privileges, and/or the like). Furthermore, a given object, such as a database, can itself contain one or more objects such as schemas, tables, materialized views, and/or the like. A given table can be organized as a collection of records (e.g., rows) that each include a plurality of attributes (e.g., columns). In some implementations, database data can be physically stored across multiple storage units, which may be referred to as files, blocks, partitions, micro-partitions, and/or by one or more other names. In many cases, a database on a cloud data platform serves as a backend for one or more applications that are executing on one or more application servers.

BRIEF DESCRIPTION OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present disclosure and should not be considered as limiting its scope.

DETAILED DESCRIPTION

Figure 1:
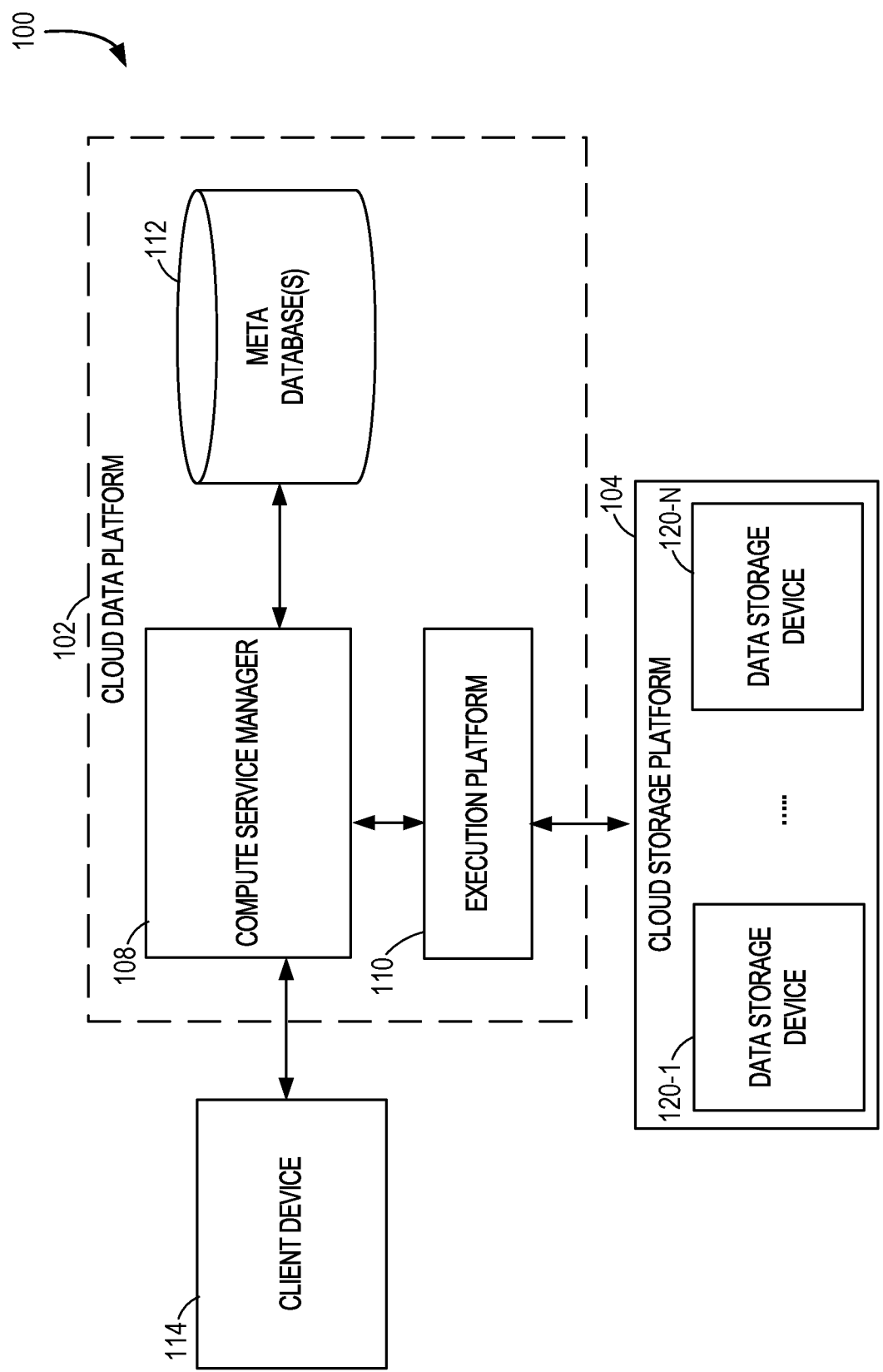
FIG. 1 illustrates an example computing environment that includes a cloud data platform in communication with a cloud storage provider system, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

In some instances, it may be beneficial to replicate database data in multiple locations or on multiple storage devices. Replicating data can safeguard against system failures that may render data inaccessible, cause the data to be lost, or cause the data to be permanently unreadable. While replication between different databases increases the safety of the data, the data should be securely transmitted between the replication databases. Some existing database systems use encryption keys to authenticate one another and to encrypt data sent between the different database systems. For example, a database instance in one datacenter can use an encryption key to authenticate and receive communications from another database instance in another datacenter that is located at a different geographic location. While replication of database data and encryption keys increase the security of the data, implementing such existing approaches in different networked database systems, such as cloud data platforms, can be difficult to perform in a manner that is computationally efficient and secure.

Databases are widely used for data storage and access in computing applications. Databases can include one or more tables that include or reference data that can be read, modified, and/or deleted using queries. Customers in all areas of business have a need for secure data, for example, customers in the financial, retail, and healthcare industries require that their data be secure both at rest and in motion. This requires that all network access be secured at all times. New security and networking paradigms, such as firewalls and a private cloud (PC) or a virtual private cloud (VPC), prevent malware from directly communicating with attackers or adversaries. One such way to ensure secured network access and secured data includes the creation or use of a PC or VPC.

Example embodiments can include the use of a private cloud (PC) or a virtual private cloud (VPC), for simplicity examples will use a virtual private cloud (VPC); however, it will be understood by those of ordinary skill in the art that embodiments can otherwise apply to one or more private clouds or the like. For purposes of this disclosure, a virtual private cloud (VPC) can comprise (or refer to) a private cloud that includes private, dedicated, and isolated network environment(s) within a public cloud, enabling the organization to leverage the benefits of cloud computing (e.g., flexibility and scalability) while maintaining a higher level of security and control over the network resources, such as VPCs, virtual private networks (VPNs), load balancers, and the like. A VPC can include an on-demand configurable pool of shared computing resources allocated within a public cloud environment, providing a certain level of isolation between different organizations (e.g., different users) using the resources. A cloud data platform for data storing, data warehousing, data sharing, data lakes, consumption of real-time data, or the like can implement or configure a VPC, such as a virtualized environment that is configured on dedicated hardware instances, which can be physically isolated from other customers. For example, the cloud data platform can be a network-based data platform, network-based data system, cloud data platform, virtual private cloud data platform, virtual private data platform, or the like.

In an example implementation, a cloud data platform includes one or more databases that are maintained on behalf of a customer account (e.g., accounts of one or more data providers). Data can be shared between a provider account, which owns the data, and a consumer account (e.g., receiver account), which can have access to the data using two-way secure data sharing between private and public clouds according to a relationship establishment procedure (e.g., a handshake) to ensure a trust relationship is established between the provider and the consumer. Indeed, the cloud data platform can include one or more databases that are respectively maintained in association with any number of customer accounts, as well as one or more databases associated with a system account (e.g., an administrative account) of the cloud data platform, one or more other databases used for administrative purposes, one or more other databases that are maintained in association with one or more other organizations or for any other purposes, or some combination thereof. A cloud data platform can also store metadata in association with the cloud data platform in general, in association with, for example, particular databases or particular customer accounts, or some combination thereof. Users or executing processes that are associated with a given customer account can, via one or more types of clients, be able to cause data to be ingested into the database, and can also be able to manipulate the data, add additional data, remove data, run queries against the data, generate views of the data, and so forth.

When enabling data sharing on or through a VPC data platform, both the cloud data platform consumer and the cloud data platform provider in a multi-tenant environment must first have an agreement (e.g., usually an offline agreement) and provide such an agreement to the VPC data platform to confirm data can legally or rightfully be shared (e.g., an executed agreement). This causes an elongated process for customers and has created the need for a more simplistic mechanism to enable sharing to and from or between a provider and a consumer without the cloud data platform feedback step. For example, a consumer can include a user or an application that runs queries against the data stored in the VPC data platform, such as data analysts, data scientists, or other types of users who need to access and analyze data. For example, a provider can include an entity or user that provides data to the cloud data platform, such as other cloud-based services, organizations, or a provider can be on-premises data source(s) (e.g., a relational database or flat files).

In some instances, it may be beneficial to replicate database data across multiple geographic locations, across multiple database vendors or providers, and/or across multiple computing devices that can be located in the same physical location or in two or more different locations. These multiple locations, vendors, providers, and/or computing devices can be referred to herein as "deployments." For example, a deployment can be a database management system (DBMS) running within an Amazon Web Services® (AWS) Virtual Private Cloud (VPC), where different deployments can be linked, and channels can be set up to transmit and receive data between one or more deployments in different regions. For purposes of this disclosure, a virtual private cloud (VPC) deployment (also referred to as a virtual private cloud data platform) includes a virtualized environment that runs only on the cloud data platform dedicated hardware instances, which are physically isolated from other customers of the cloud data platform. Region(s) can be supported for organizations that prefer or require their data to be stored in different physical (e.g., geographical) areas (e.g., United States, Canada, Brazil, etc.), where a cloud region is a geographic area identified by a cloud region identifier (ID) and a cloud platform (e.g., AWS). For example, each account of the cloud data platform can be hosted in a single region, spread across multiple regions, or a combination thereof. For example, a private cloud deployment can include a VPC deployment in a first region (e.g., New York) designated as a private region and a public cloud deployment can include a public multi-tenant cloud deployment in a second region (e.g., Brazil) designated as a public multi-tenant region. Customers of the cloud data platform can enable or disable global visibility as desired or required to add regions where one or more listings of the customer are made visible. Region availability can be a parameter (e.g., field name) in a data exchange of the cloud data platform that allows customers to enable or disable regions where the customer's listing is visible in order to allow customers (e.g., data consumers) in that region to see (e.g., view) the customer's listing(s). However, many VPCs are not configured for replication between the different VPCs and may charge egress export fees (e.g., egress fees) even though the traffic is being replicated to another deployment of the same VPC provider. Further difficulty arises when sending data between different types of database deployments securely. While data sharing using a VPC deployment (also referred to as a VPC data platform) is possible through list auto-fulfillment (LAF), such sharing is limited to one-way sharing, namely, sharing data from the public to a VPC.

Example embodiments of the methodologies described herein facilitate solving the technical problems of data sharing between a provider and a consumer, and vice versa, without requiring offline interaction. As such, one or more of the methodologies described herein can obviate a need for certain efforts or computing resources that otherwise would be involved in complicating the exchange of secured data. As a result, resources used by one or more machines, databases, or devices (e.g., within the environment) can be reduced. Examples of such computing resources include processor cycles, network traffic, memory usage, data storage capacity, power consumption, network bandwidth, and cooling capacity.

To address the foregoing issues, example embodiments of the present disclosure enable a provider in a VPC region group to share data into a public region by providing an interface for the VPC data platform consumers and providers, such that the provider organization is enabled to share into their VPC data platform, and vice versa. In this way, a provider can provide a listing of the VPC provider to a consumer in the public and make it available to the consumer. The VPC owners can decide with whom to share data within the public region, and a firewall for the VPC to the public region can be lifted only once, such that providers can share data with any consumer in the public region upon establishing a connection (e.g., via a token-function exchange, using a relationship procedure, employing a handshake, or the like). Further example embodiments enable the reverse, where a consumer is in the VPC region group, and a provider is in a public region group.

Example embodiments of the present disclosure include methods and systems to support data sharing from a VPC to the public, and vice versa, by enabling VPC providers to create a public account and share data to multi-tenant consumers. Such technical problems relating to data sharing from a VPC to the public requires using listing auto-fulfillment, which is a risk on the provider. For example, such requirements initially require a provider and a consumer to synchronize offline in order to agree on sharing and/or consuming data, and the platform must be made aware of such arrangements.

Moreover, it is often the case that data providers are direct customers of a cloud data platform. As examples, data providers can provide one or more types of data, such as financial data (e.g., stock prices), weather data, pandemic test results, vaccination levels, and/or the like. These data providers typically have one or more customers of their own that consume the data; these entities are referred to in the present disclosure as "data consumers" or simply "consumers." In some examples, a data consumer might be a trading house that consumes financial data from a data provider.

To address these and other issues and shortcomings of prior implementations, disclosed herein are various examples of systems and methods for database replication to a remote deployment with automated fulfillment. As used herein, "fulfillment" is a term that generally relates to performing one or more tasks as requested by, for example, a data-consumer customer of a data provider, which in various examples are a direct customer of the cloud data platform, as described above. A specific though non-limiting example of fulfillment in the context of the present disclosure is achieving what a data-consumer customer requests regarding database replication in remote deployments of the cloud data platform. More generally, fulfillment can be defined as getting data where it needs to be when it needs to be there.

Example embodiments include a cloud-based data storage and analytics service, sometimes referred to as a "data warehouse-as-a-service" or "software-as-a-service" that allows users to store and analyze data using cloud-based hardware and software. A cloud data platform configured for data storing, data warehousing, data science, data security, consumption of real-time data, data lakes, data sharing, and the like comprises components such as cloud services, query processing, and/or database storage. Example embodiments of a cloud data platform described herein include data-sharing capabilities where users can share their data with customers in a governed and secure manner in near-real time or real-time. Such secure data sharing enables the sharing of one or more selected objects in a database, such as tables, secure views, secure materialized views, and the like.

A user of the cloud data platform can be a provider that creates "shares" and makes the "shares" available to other users of the cloud data platform to consume. Data providers can share a database with one or more other cloud data platform users, where the cloud data platform maintains and/or supports grants to provide granular access control to selected objects in the database (e.g., access privileges are granted for one or more specific objects in a database). A provider can create a "share" of a database (e.g., a database share), where the "share" can be an object that encapsulates information required to share a database with other users. For example, a share can consist of privileges that grant access to one or more databases, schema containing the objects to share, privileges that grant access to the specific objects in the one or more databases, and/or consumer accounts with which the one or more databases and its objects are shared.

The database shares can be configured or created by the provider and accessed or imported by a data consumer, such as a consumer of the cloud data platform. Once a database is shared with or created in a consumer's platform from the share, all the shared objects are accessible to the consumer. A consumer (e.g., a data consumer user) can include a user that creates one or more databases from one or more shares made available by a data provider. For example, once a shared database is connected, a data consumer can access and/or query the objects in the database. In some example embodiments, a user can be a consumer, a provider, or both a consumer and a provider of shared data. Additionally, third-party users may exist that share data from only a single provider.

Based, at least in part, on the architecture of the cloud data platform described herein, the platform enables creating a network of providers that can share data with multiple consumers, and consumers that can access shared data from multiple providers. In some examples, different configurations in which platform data sharing can be performed include a multi-tenant (MT) provider to a consumer in a VPC deployment, a VPC deployment provider to a consumer in multi-tenant environment, or a VPC deployment provider to a consumer in multi-tenant deployment.

As used herein, a multi-tenant cloud can comprise (or refer to) a cloud deployment that is shared by multiple users (e.g., organizations) referred to as "tenants." In a multi-tenant cloud deployment, a single instance of the cloud data platform environment is created and maintained but is logically partitioned to provide dedicated resources and isolation for each tenant. In a multi-tenant cloud deployment, tenants can share the underlying infrastructure, such as hardware, network, computing resources, storage, and the like, while maintaining logical isolation and separation. It will be understood by one having ordinary skill in the art that the present disclosure can similarly apply to other cloud deployment models, such as single-tenant or dedicated deployments.

In some example embodiments, such as a multi-tenant (MT) deployment to a VPC deployment, large financial institutions or companies handling sensitive consumer data may be required to secure all their data both at rest and while the data is in motion. Such institutions use encryption to secure data while at rest and require VPC deployments to ensure data is protected from a networking perspective. When companies with these high levels of security operate within a multi-tenant environment using data from a cloud data platform marketplace, providers existing in the MT environment must be able to share data with customers in a VPC deployment or a VPC network. In a VPC instance, a provider decides to share data with a customer or consumer in a MT deployment. Once the provider opens the firewall (e.g., disables the firewall policy to allow inbound and outbound listings, messages, requests, etc.) to share with the outside world, the provider can create a public listing and/or a private listing (e.g., similarly to any other MT provider). For example, a VPC owner can communicate with a multi-tenant consumer, where the consumer wants to share their data and get account information.

In example embodiments of the present disclosure, for example, data sharing into a virtual private cloud data platform consumer interface can include a public provider (e.g., a multi-tenant deployment provider) and a virtual private cloud data platform consumer (e.g., a VPC deployment consumer) already maintaining a relationship. For example, a provider must arrange for a share origination, such as a handshake, but more specifically, a relationship establishment process or procedure. For example, a relationship establishment procedure can begin with the MT deployment (e.g., public) generating a token and the VPC deployment consuming the token, as the token can guarantee that it is produced by public generation. In other words, the token serves as a vehicle to identify who the VPC deployment provider is, in order to provide confidence and security that all parties are who they claim to be. In additional examples, other types of handshakes may be substituted for the relationship establishment. A challenge is that data-sharing is live and there must also be support for providers to remove access, change the data, or, on a live-basis, take away the data or any number of other actions. Such actions or permissions may, at times, be required to be instantaneous or nearly instantaneous for the other party (e.g., for the consumer), as well as for the provider. An advantage provided by the present disclosure includes delivering data in a multi-cloud, multi-deployment situation where the interaction between the providers and consumers of data using a secure conduit can be coupled and decoupled without an intermediary.

For example, first, a public provider can generate a token or enable a security token to be generated, using a system function of the VPC data platform. The token can be configured to contain provider organization information (e.g., deployment information, status, name, identifiers, etc.). The public provider transmits or sends the token to the VPC data platform consumer, and, upon receiving the token, the VPC data platform (e.g., the VPC deployment) is configured to allow or enable the requested share of data.

Example embodiments include technical solutions over prior data sharing attempts by implementing a system providing a cloud data platform acting as a facilitator to record the relationship between the provider and consumer to facilitate secure data sharing. Once the relationship is accepted, where one or more tokens are consumed to establish identity, the VPC data platform can enable sharing between the provider and the consumer. Once established, the VPC data platform can include a firewall bypass function to confirm the status of the relationship and enable the provider with the specified allowance to bypass the firewall for the message that is used for sharing. In some examples, the system function called with the token to allow the share can include first sending a message to the token's deployment to decrypt the token, which, in turn transmits a message to add the VPC data platform into the provider organization's data sharing deployment locations.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components can be included as part of the computing environment 100 to facilitate additional functionality that is not specifically described herein. In other embodiments, the computing environment can comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google® Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user can utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 can include a summary of data stored in remote data storage systems as well as data available from a local cache. Additionally, a metadata database 112 can include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 can include distributed file systems (e.g., as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110. The compute service manager 108, and metadata database(s) 112 are operatively connected to the execution platform 110 as a long running service to handle related operations.

In some embodiments, communication links between elements of the computing environment 100 are implemented via one or more data communication networks. These data communication networks can utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service manager 108, metadata database(s) 112, execution platform 110, and cloud storage platform 104 can be implemented as a distributed system (e.g., distributed across multiple systems/platforms at multiple geographic locations). Additionally, each of the compute service manager 108, metadata database(s) 112, execution platform 110, and cloud storage platform 104 can be scaled up or down (independently of one another) depending on changes to the requests received and the changing needs of the cloud data platform 102. Thus, in the described examples, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 can divide the job into multiple discrete tasks and can determine what data is needed to execute each of the multiple discrete tasks. The compute service manager 108 can assign each of the multiple discrete tasks to one or more nodes of the execution platform 110 to process the task. The compute service manager 108 can determine what data is needed to process a task and further determine which nodes within the execution platform 110 are best suited to process the task. Some nodes can have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources can retrieve data from, and store data to, any of the data storage resources in the cloud storage platform 104.

Figure 2:
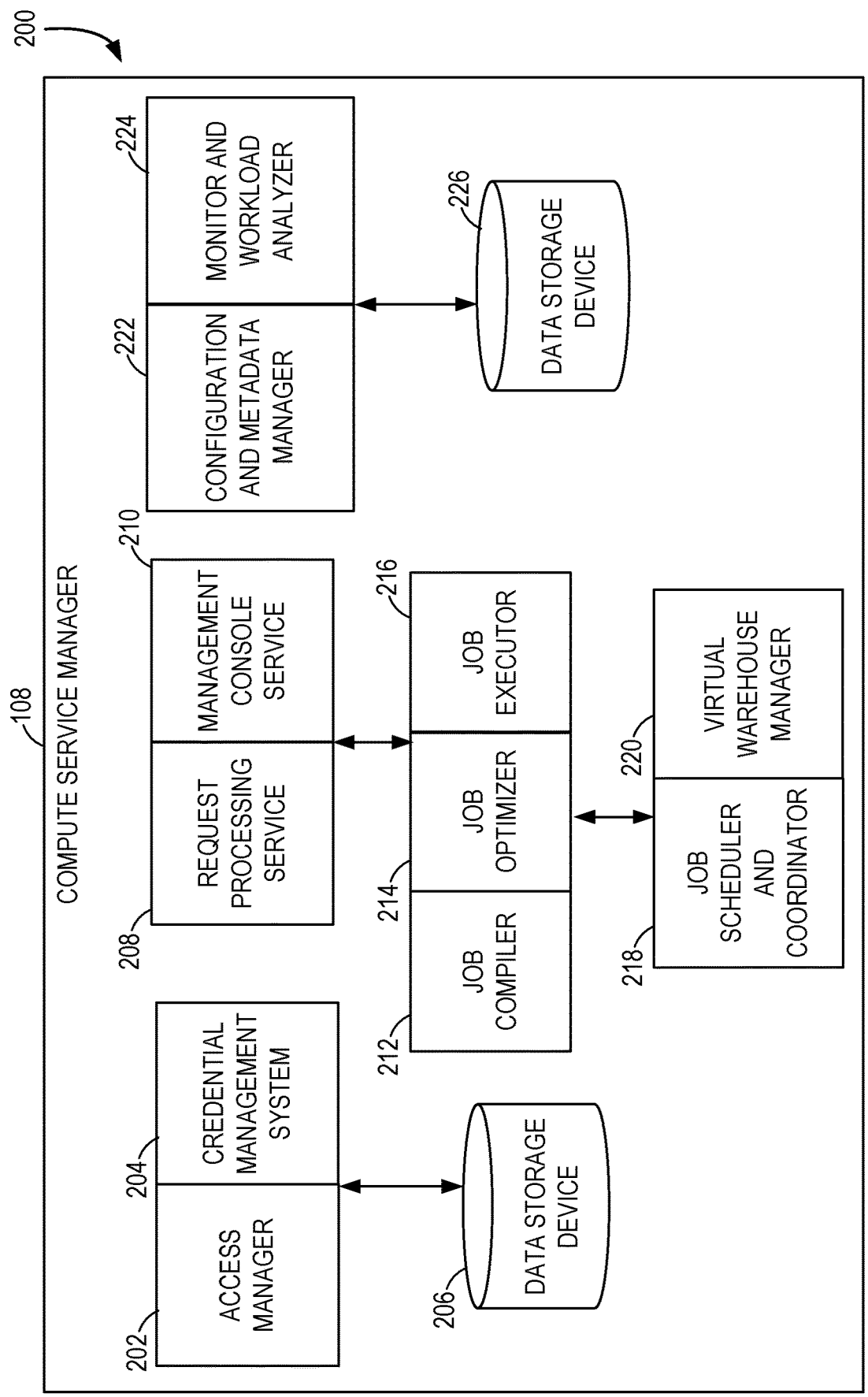
FIG. 2 is a block diagram illustrating components of an example compute service manager, in accordance with some examples.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to access data storage device 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices can also be referred to as "persistent storage devices" or "shared storage devices." For example, the credential management system 204 can create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 can determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 can receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The j ob optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but can utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 can generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and can further redistribute tasks based on a user (e.g., "external") query workload that can also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 can represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) can need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
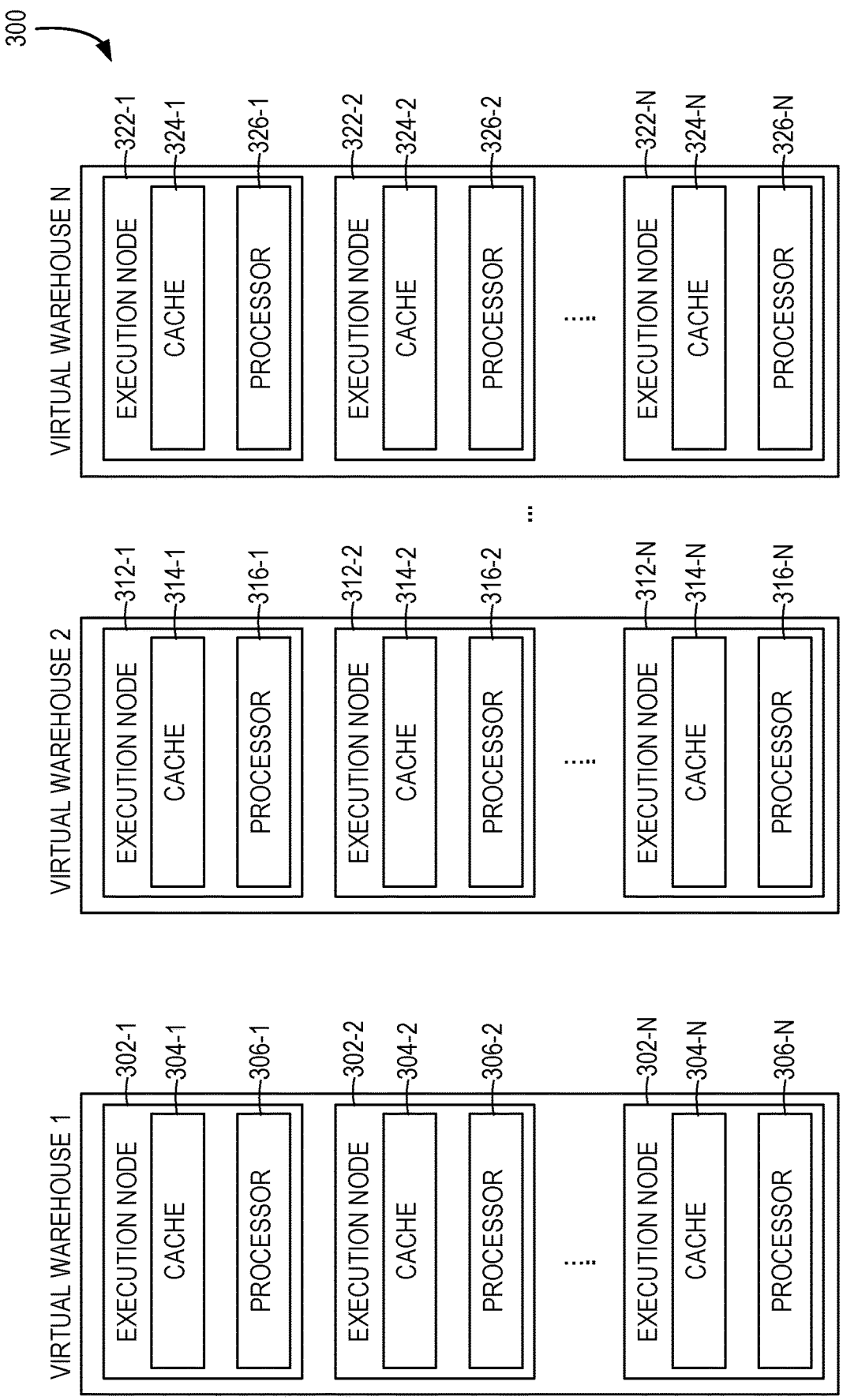
FIG. 3 is a block diagram illustrating components of an example execution platform, in accordance with some examples.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse can include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node can later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse can handle data storage and data retrieval tasks associated with an internal service, such as a clustering service, a materialized view refresh service, a file compaction service, a storage procedure service, or a file upgrade service. In other implementations, a particular virtual warehouse can handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments can include execution nodes containing any number of processors and any number of caches. Additionally, the caches can vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources can vary between different execution nodes. For example, one execution node can contain significant computing resources and minimal cache resources, making the execution node useful for tasks that require significant computing resources. Another execution node can contain significant cache resources and minimal computing resources, making this execution node useful for tasks that require caching of large amounts of data. Yet another execution node can contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node can change over time based on changing tasks performed by the execution node. For example, an execution node can be assigned more processing resources if the tasks performed by the execution node become more processor intensive. Similarly, an execution node can be assigned more cache resources if the tasks performed by the execution node require a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node can depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 can include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful. In some embodiments, the virtual warehouses can operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
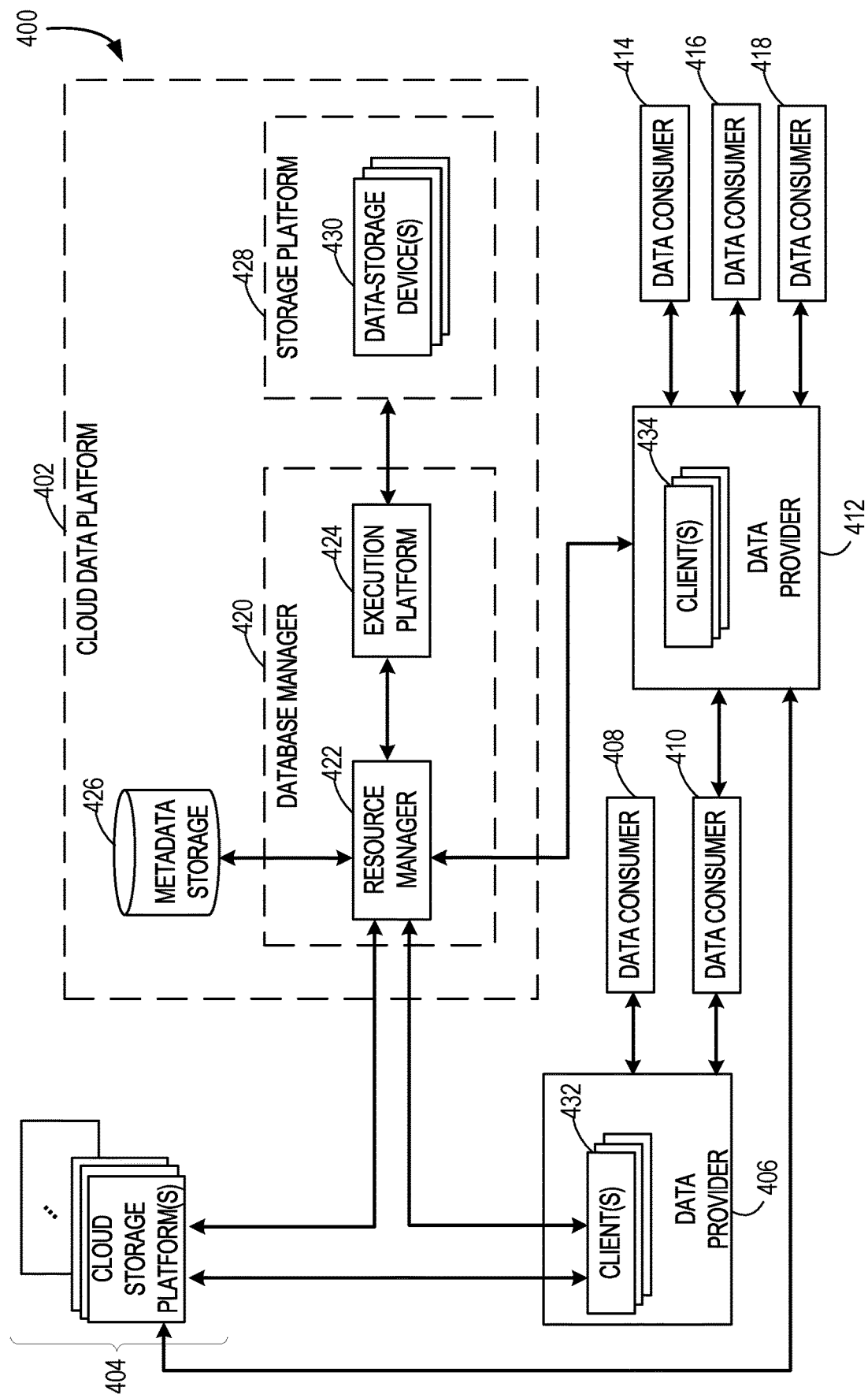
FIG. 4 is a system diagram that illustrates an example communication context that includes an example cloud data platform, multiple example data providers, and multiple example data consumers, in accordance with some examples.

FIG. 4 illustrates an example communication context 400 that includes an example cloud data platform 402, multiple example data providers 406/412, and multiple example data consumers 408/410/414/416/418. The example communication context 400 of FIG. 4 includes an example cloud data platform 402, one or more example cloud storage platforms 404a-404n, an example data provider 406 serving an example data consumer 408 and an example data consumer 410, and an example data provider 412 also serving the data consumer 410, and further serving an example data consumer 414, an example data consumer 416, and an example data consumer 418. Fewer, more, and/or different instances of one or more of the entities in FIG. 4 can be present in other example situations and scenarios, as the communication context 400 of FIG. 4 is provided here purely by way of example and not limitation. The various components of FIG. 4 can be similar to the components as described and depicted in connection with FIG. 1.

In various examples, the cloud data platform 402 can be used for performing one or more of the operations (e.g., one or more of the methods, processes, and/or the like) that are disclosed herein. As a general matter, in at least some embodiments, the cloud data platform 402 can be referred to using terms such as a cloud-based data warehouse, a network-based data warehouse, or simply a data warehouse. A cloud-based data warehouse is one type of network-based data system that can be used, as examples, for data analysis and reporting, and that includes a central repository of integrated data from one or more disparate sources. A cloud-based data warehouse is commonly an OLAP database that can store current and historical data that can be used, for example, for creating analytical reports for an enterprise based on data stored within databases maintained on behalf of the enterprise. Data warehouses often provide business-intelligence tools, tools to perform extract-transform-load (ETL) tasks for ingesting data into the repository, tools to manage and retrieve metadata, and/or the like. Moreover, there are other types of cloud-based data warehouses, such as OLTP databases, as well as data warehouses and other data systems that operate with characteristics of multiple types of database systems.

Prior to discussing the communication context 400 of FIG. 4 in further specificity, it is noted that any one or more of the components, devices, systems, and/or the like that are depicted in FIG. 4 and/or in any of the other figures could be implemented as one or more computing devices having similar or different infrastructures than provided here. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, embodiments, any one or more of the communication links depicted in FIG. 4 and/or in any of the other figures can utilize any communication protocol and any type of communication medium deemed suitable by those of skill in the art for a given implementation or in a given context. Additionally, in various embodiments, one or more of the communication links depicted herein could be implemented via one or more data-communication networks. In some embodiments, a given data-communication network could be a combination of two or more data-communication networks (or sub-networks) coupled to one another.

In at least one example, and as depicted in FIG. 4, the cloud data platform 402 includes a database manager 420, which in turn includes a resource manager 422 and an execution platform 424. The database manager 420 need not be a defined physical device, though it could be, but in general is used herein as shorthand to refer to the combination of the resource manager 422 and the execution platform 424. The execution platform 424 can include one or more execution nodes (e.g., servers, workers, threads, and/or the like). A grouping of execution nodes in the execution platform 424 can be referred to as a virtual warehouse, and such virtual warehouses are, in at least some embodiments, dynamically scalable to meet dynamically changing demands. Also depicted in FIG. 4 as being components of the cloud data platform 402 are a metadata storage 426 and a storage platform 428, the latter of which includes one or more data-storage devices 430.

In some embodiments, different sets of entities are part of what is referred to herein as the cloud data platform 402. For example, in at least one embodiment, the cloud data platform 402 does not include any of the one or more clients 432 or clients 434. As another example, in some embodiments, the cloud data platform 402 does not include the storage platform 428. In the embodiments that are primarily described herein to illustrate various examples, and as is depicted in FIG. 4, the cloud data platform 402 includes the database manager 420 (including the resource manager 422 and the execution platform 424), the metadata storage 426, and the storage platform 428, and does not include any of the other entities that are depicted in FIG. 4. As described below and as mentioned above, the storage platform 428 could be implemented in whole or in part on a cloud platform and still be considered part of the cloud data platform 402.

The resource manager 422 can be configured to manage a number of different types of tasks including external database tasks (e.g., query requests) that are received from (e.g., a client 432 or a client 434). The resource manager 422 can be coupled to any number of clients 432, clients 434, and/or any number of other clients. A client 432 or client 434 can facilitate end users making data-storage and/or data-retrieval requests, system administrators managing the cloud data platform 402, and/or the like. In various embodiments, a client 432 or a client 434 could be a web interface, a JDBC driver, an ODBC driver, a desktop application, a mobile app, and/or another type of client. As shown in FIG. 4, a client 432 can communicate with the cloud data platform 402 (e.g., the resource manager 422 of the database manager 420) and with one or more cloud platforms 404. A client 432 or a client 434 could reside on a client-side computing device on which the client 432 or the client 434 interacts with one or more client-side applications and on which the client 432 or the client 434 makes use of certain client-side-system resources such as network interfaces, user interfaces, memory (e.g., random access memory (RAM)), and/or the like.

As depicted in FIG. 4, the resource manager 422 is communicatively coupled to the metadata storage 426, which in at least one embodiment is associated with data stored throughout the communication context 400. Indeed, in some embodiments, the metadata storage 426 includes one or more summaries of data available in one or more local caches (e.g., the resource manager 422 and/or the execution platform 424), data stored in the storage platform 428, and/or the like. In various embodiments, metadata—that reflects the contents of a database, a table, a column, a materialized view, and/or one or more other collections of records or parts of records—may be referred to herein as expression properties. Additionally, the metadata storage 426 can include information regarding how data is organized in one or more local caches, one or more storage platforms 428, and/or the like.

Among other uses, the metadata storage 426 can allow systems and services of the communication context 400 to determine whether a given quantum of data needs to be processed (in connection with, for example, a given query) without loading or accessing the actual stored data. In various embodiments, metadata can reflect the contents of one or more databases, one or more tables, one or more columns, one or more materialized views, and/or one or more other collections of records, parts of records, and/or other data quanta. With respect to where the metadata storage 426 is actually stored, a separate (e.g., local) storage location (e.g., a key-value store) is used in some embodiments, while in other embodiments the metadata storage 426 is maintained by the communication context 400 as a subset of the data stored in the storage platform 428. Other architectures are possible as well.

In the depicted arrangement, the resource manager 422 is also communicatively coupled to the execution platform 424, which can provide multiple computing resources that execute various tasks involving data storage, data retrieval, data analysis (e.g., query processing), and/or the like. In at least one embodiment, the resource manager 422 includes a layer of code (e.g., Java code) that is global with respect to the communication context 400, where that code layer includes instructions for performing functions such as compiling queries and brokering requests to one or more execution nodes in the execution platform 424. In some embodiments, there exists (i) one or more instances of the execution platform 424 that is/are used for executing client tasks such as database queries and (ii) one or more instances of the execution platform 424 that is/are used for executing internal database tasks such as updating metadata, clustering tables, generating materialized views, and/or the like. In some such embodiments, there also exists one or more instances of the execution platform 424 that is/are used for feature development and/or testing of the communication context 400, and each such instance of the execution platform 424 can be separate from each client-task instance of the execution platform 424, such that, for example, client-task processing is not impacted by feature-development tasks, data-platform-administration tasks, and/or the like. Other arrangements are possible as well.

The execution platform 424 can be coupled to the one or more data-storage devices 430 that are part of the storage platform 428, which can include (and an execution platform 424 can be capable of communicating with) any number of data-storage devices 430. In some embodiments, one or more of the data-storage devices 430 are cloud-based storage devices located in one or more geographic locations. For example, one or more of the data-storage devices 430 can be part of a public cloud infrastructure or a private cloud infrastructure. One or more of the data-storage devices 430 can be or include hard disk drives (HDDs), solid state drives (SSDs), storage clusters, and/or any other data-storage technology. In some examples, the storage platform 428 includes distributed file systems (such as Hadoop Distributed File Systems (HDFSs)), object storage systems, and/or the like.

As shown in FIG. 4, the storage platform 428, including the one or more data-storage devices 430, is decoupled from the computing resources of the resource manager 422, the execution platform 424, and the database manager 420 generally. In an embodiment, each of a plurality of data-platform deployments includes a respective storage platform 428 having its own respective one or more data-storage devices. That type of architecture supports dynamic changes made by the communication context 400 based on changing data-storage and/or data-retrieval needs, as well as changing needs of users and systems accessing the communication context 400. The support of dynamic changes allows the communication context 400 to scale quickly in response to changing demands on the systems and components within the communication context 400. The decoupling of the computing resources of the database manager 420 from the data-storage devices 430 of the storage platform 428 supports the storage of large amounts of data without requiring a corresponding large amount of computing resources. Similarly, this decoupling supports a significant increase in the computing resources utilized at a particular time without requiring a corresponding increase in data-storage resources.

Figure 5:
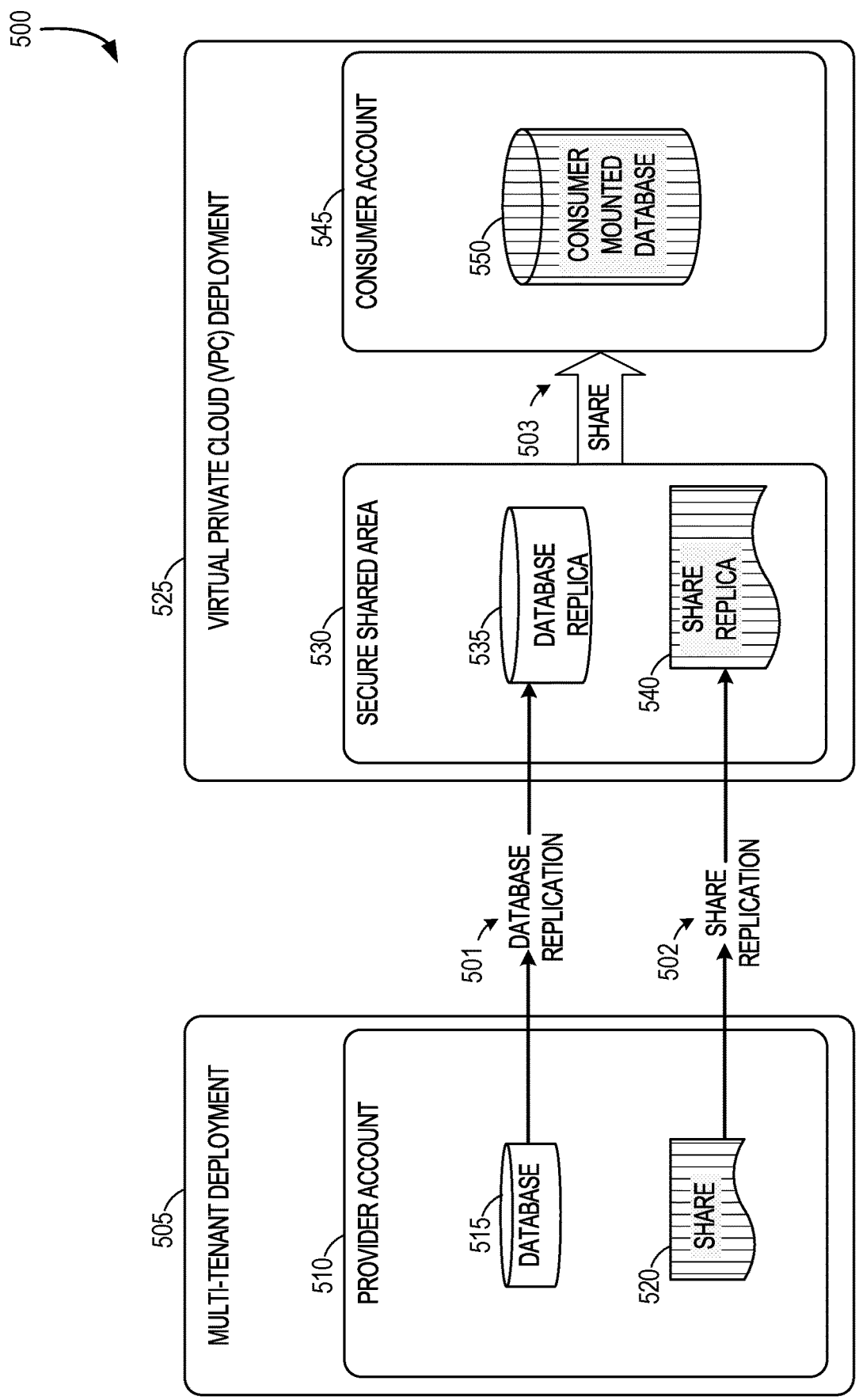
FIG. 5 is a block diagram illustrating components of an example shared-data architecture, in accordance with some examples.

FIG. 5 shows the data architecture 500 for data sharing, according to some example embodiments. Any time data is shared from different environments, there is a need to have the two or more parties to share data without accessing the shared parties' environments. So, a need for a sharing mechanism where a provider and consumer create a conduit that has security built in, where the conduit acts to decouple the interaction between the two parties. A secured share area (SSA) is a mechanism that allows for that conduit. SSA is a conduit that creates a type of data escrow, where data comes in and data goes out of the SSA and all the actions regarding what data goes in, what data gets deleted, etc. and all of those actions are managed by a VPC data platform list-auto fulfillment as a product. There are specific rights and privileges provided to both parties. For example, the consumer can have access to the data within certain bounds only.

The multi-tenant deployment 505 comprises a plurality of provider accounts that operate computational devices within the same deployment as co-tenants. In the example illustrated, the multi-tenant deployment 505 comprises a provider account 510 which has a database 515 and the share object 520. In some example embodiments, the provider account 510 creates a link to share data with a consumer account 545 that is in a virtual private cloud (VPC) deployment 525, which is deployment dedicated or managed only by a single organization (e.g., banking organization) and no other tenants are hosted in the VPC deployment 525, unlike the multi-tenant deployment 505. The consumer account 545 can receive and click on the link created by the provider account 510 to share data with the VPC deployment 525.

Upon the link being selected, the secure shared area 530 is automatically created by the secure share system in the VPC deployment 525 (e.g., programmatically, without end-user interaction). The secure shared area 530 operates as a database account, with restrictions, including no user facing interface (e.g., no login access). Further in response to the link being selected, the database 515 is replicated via database replication 501 into the secure shared area 530 as database replica 535, and the share object 520 is replicated via share replication 502 into the secure shared area 530 as the share object replica 540. The data in the secure shared area 530 is then shared with the consumer account 545 as data share objects, which the consumer account 545 can launch (e.g., mount, initialize, etc.) in a consumer mounted database 550. The consumer account 545 can be granted permission or access to the data by making a database available for use by a database management system (DBMS) or an application that interacts with the database. In additional examples, such as the use of a relational database, mounting the database can include bringing the database files into a consistent state and allowing the DBMS to access and manage the data stored within those files. It will be understood by those having ordinary skill in the art that the specific steps or commands required to mount a database can vary depending on the DBMS being used.

Once the consumer mounted database 550 is created and has access to the replicated share data that is shared 503 with the consumer account 545 can then perform database operations (e.g., queries) on the provider's data within the virtual private cloud deployment 525 in a secure and computationally efficient manner.

Figure 6:
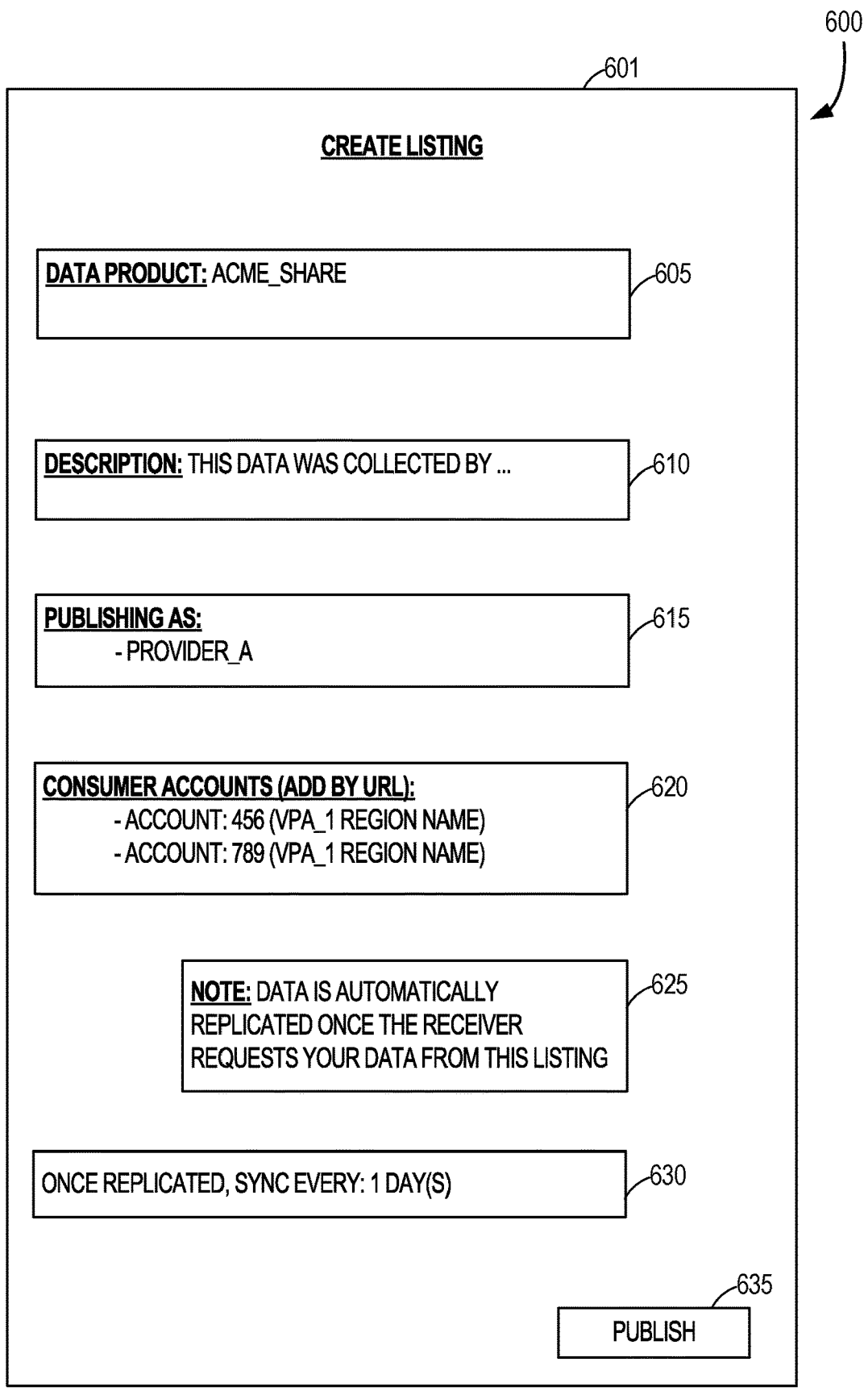
FIG. 6 is a block diagram illustrating components of an example private deployment share creation user interface, in accordance with some examples.

FIG. 6 shows a private deployment share creation user interface 600 for securely sharing data to a virtual private cloud (VPC) deployment of the cloud data platform 402, in accordance with some example embodiments. The listing includes an enhanced method of secure data sharing using a provider-consumer model of the cloud data platform. The provider can use a listing to share data in the provider cloud data platform account with other cloud data platform accounts privately or by offering the listing on the cloud data platform. The consumer can use a listing to access data shared by other cloud data platform accounts or privately within the consumer account.

The creation user interface 600 includes an object 601 for creating a listing. In the object 601, there is an element 605 that is a field that can be implemented to specify which data product to share to the VPC deployment (e.g., database 515 and share object 520). An element 610 is a description field in which strings that describe the data to be shared can be included. An element 615 is a field to specify which provider account is publishing the data for sharing into the VPC deployment. An element 620 is a field in which multiple consumer accounts can be specified by network address (e.g., URL) or identifier that is unique to the different consumer accounts on the cloud data platform 402. In some example embodiments, only the consumer accounts that are input into the element 620 will receive notifications or otherwise be able to access the data to be shared from the multi-tenant deployment (e.g., from the provider account 510). An element 625 is a text field that indicates the data is automatically replicated once the receiver requester data from this listing (e.g., the data is automatically shared to the secure shared area 530 is automatically created within the VPC deployment 525 in response to the link being selected by the consumer account 545).

An element 630 is a field to specify how often to synchronize the data from the provider account in the multi-tenant deployment to the secure shared area in the VPC deployment. An element 635 is a published button that creates or causes the secured shared area to be created after which point consumer accounts receive notification and data replicated and shared, as discussed above.

Figure 7:
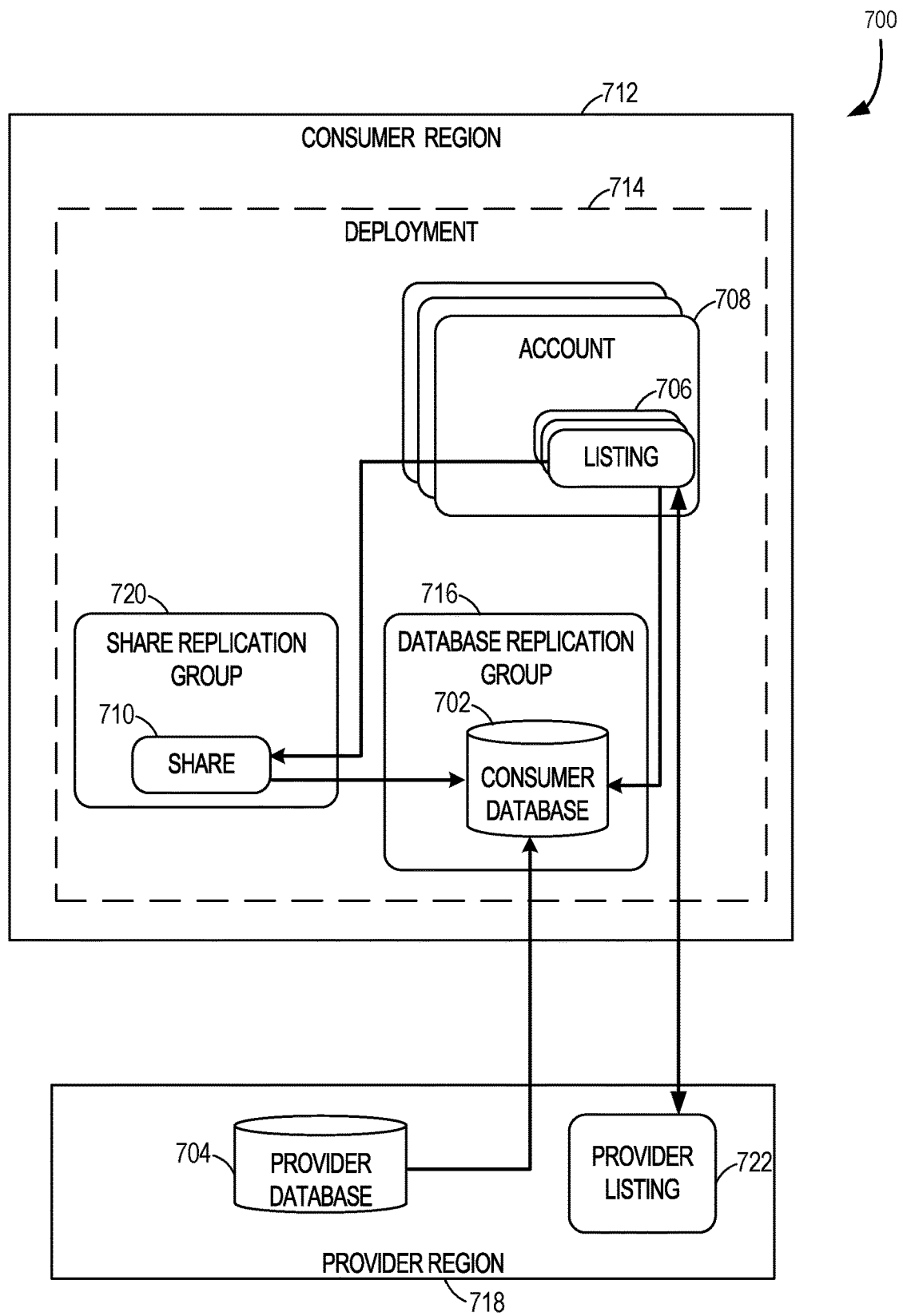
FIG. 7 shows a deployment diagram of an example database system deployment, in accordance with some examples.

FIG. 7 is a deployment diagram of a database system deployment 700 in accordance with some examples of the present disclosure. A provider region 718 includes a provider database 704 that is maintained by a data provider. A consumer region 712 includes a consumer database 702 which is a replica of the provider database 704 in the provider region 718. The consumer database 702 can be a complete copy of the provider database 704 or can include one or more slices of the provider database 704. The provider region includes a provider listing 722 that is maintained by the data provider. The provider listing includes a listing of the data services that are provided in conjunction with the provider database 704. The consumer region 712 includes a listing 706 which is a replica of the provider listing 722.

The consumer region 712 includes one or more accounts, such as account 708. The one or more accounts are associated with one or more respective consumers of the data provided by the provider associated with the provider database 704. An account includes one or more listings, such as the listing 706 of the account 708. A listing can include metadata describing the shared data. A listing points to one or more databases, such as consumer database 702 and one or more shares, such as share 710, which are associated with a database. Share 710 includes grant metadata describing access grants made to the consumer database 702 for the one or more consumers of the consumer region 712. The share 710 is an object that acts as a wrapper or a container around the database 702. The share 710 includes multiple objects and can be shared with various users, which grants those users access to those objects. The share 710 acts as an access-control (including, for example, visibility control) container for the consumer database 702. In various embodiments, only entities that have had a given share shared with them are able to see and access whatever one or more objects, such as the consumer database 702, that are associated by that given share.

A component of a cloud data platform, such as compute service manager 108, creates a deployment 714 of the consumer database 702 and the share 710 associated with the consumer database 702 during execution of a fulfillment task associated with the listing 706. In some embodiments, during the fulfillment task, the compute service manager 108 creates a deployment 714 of initial versions of the consumer database 702 and the share 710 for use by a consumer associated with the account 708. The compute service manager generates a replica database in the deployment 714 and copies data from provider database 704 to the replica database. The compute service manager generates share 710 based on the consumer database 702. The compute service manager links the replica database as consumer database 702 to the listing 706 and links the share 710 to the listing 706.

To maintain the consumer database 702, the compute service manager 108 executes a refresh task based on a refresh schedule maintained by a j ob scheduler and a coordinator of the compute service manager. In some embodiments, during a refresh task, the compute service manager operates on replication groups of shares and databases, such as share replication group 720 and database replication group 716. The shares and databases of a consumer region are grouped into replication groups to facilitate refreshing the databases and shares in an orderly and consistent manner.

Additionally, metadata associated with or denoted under the provider organization can be synchronized into the VPC data platform for internal and/or external use. For example, metadata related to or regarding the organization, an account, billing contacts, billing entities, connection data, data exchange profiles, listing VPC data platform targets, replication group(s), global share(s), global database(s), or the like. The metadata can be synchronized, for example, as a global object in a key-value store in the cloud data platform. In some example embodiments, the metadata or global objects may not be exposed directly to a VPC data platform consumer. For example, customer A's metadata may not be exposed to a different customer B, even though both customer A and B are in the same deployment, and/or the metadata exists in the database, such as when a VPC data platform customer runs a show_account function, the VPC customer can see the provider organization's account.

Figure 8:
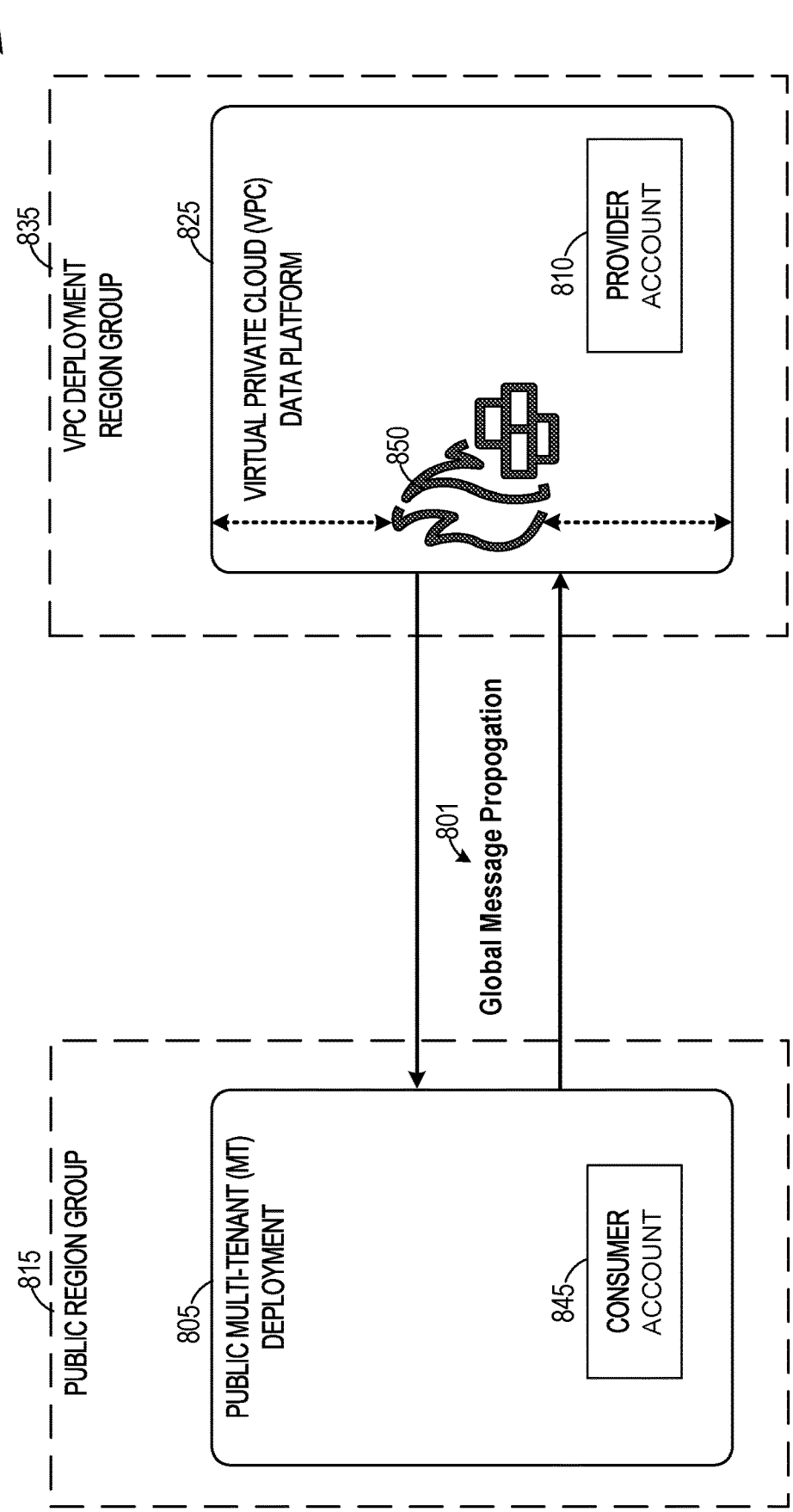
FIG. 8 is a block diagram illustrating example global message propagation through a firewall, according to some example embodiments.

FIG. 8 shows a block diagram 800 depicting message exchange between a public provider and a private consumer in different regions, in accordance with some examples. For example, the block diagram 800 depicts message(s) being exchanged in order to enable a provider in a VPC deployment region group 835 to share data into a public region group 815.

A public multi-tenant (MT) deployment 805 (e.g., consumer side) in a public region group 815 among multiple public regions is operatively connected to a virtual private cloud (VPC) data platform 825 (e.g., provider side) via a network (not shown) including a security system, such as a firewall 850. Consumers, such as a user of consumer account 845, in the public MT deployment in a public region group 815 cannot see listings of the VPC data platform provider until the provider allows it. Once a provider in the VPC data platform 825, such as the VPC deployment 525 as described and depicted in connection with FIG. 5, makes one or more listings available to the consumer, the consumer can see the listing(s).

Once the consumer account is visible to the VPC data platform provider, data needs to be shared from the VPC data platform 825 to the public multi-tenant deployment 805 in public region group 815. For example, data sharing is accomplished by the propagation of one or more global messages (e.g., global message propagation 801) between the VPC data platform 825 and the public MT deployment 805 in the public region group 815. According to some examples, when the firewall 850 is lifted, it is lifted for the entire VPC data platform 825, as the firewall 850 resides in the VPC data platform 825, global messages can only be gated (e.g., guard-railed) at the VPC data platform 825. When the global message(s) propagate from the VPC data platform 825 to the public MT deployment 805 and/or to other deployments in the public region(s), the cloud data platform (e.g., cloud data platform 102) encodes, or causes to be encoded, a payload of the global message with both a sender account identifier and a receiver account identifier. However, not all messages have access to the sender's account identifier and/or the receiver's account identifier; in other words, certain messages do not have the context of who the sender and the receiver account with regards to data sharing through listings.

As described throughout, example embodiments disclose how to enable and disable the firewall 850 to allow for secure data sharing between a provider account 810 and a consumer account 845. For example, once the relationship establishment procedure is completed between the consumer account 845 and the provider account 810, the cloud data platform can open the firewall 850 to the one or more deployments where the consumer organization resides. Thus, enabling messages from the VPC data platform 825 to propagate to one or more certain deployments to which the VPC data platform provider intends to share data.

In an additional example, the cloud data platform can open up a VPC data platform deployment to all public multi-tenant deployments when the VPC data platform provider contacts the cloud data platform for data sharing. In yet another additional example, the cloud data platform can perform a detailed analysis of all the executed actions to which the global messages get mapped and encode all consumer organization identifiers. Such application logic determines whether these messages need to be accepted or rejected based on, for example, the list of all organizations that have completed a relationship establishment procedure with the VPC data platform provider, thereby allowing for fine-grained message propagation control.

In additional example, the cloud data platform provides for bypassing the firewall 850 (e.g., disabling the firewall policy that prevents data traffic between deployments) for when each message type, among the global messages, should be allowed to bypass the firewall and for when each message type should not be allowed to bypass the firewall. This additional layer of data sharing security is accomplished using firewall configurations, where, for example, each message is verified on requester information and receiver information, as well as the type of message(s) that propagates between each deployment. Examples for when a message type should be allowed to bypass the firewall include: (a) when a firewall is already lifted, the message should pass through, (b) when a firewall is not lifted, but the sender has the VPC data platform in their organization's data sharing deployment location database, then the message should bypass the firewall, and (c) when the a firewall is not lifted and the sender does not have the VPC data platform in their organization's data sharing deployment location database, the message should be blocked (e.g., not allowed to bypass the firewall) or traffic should be prevented. Examples for when a message type should not be allowed to bypass the firewall include: (a) when a firewall is already lifted, the message should pass through and (b) when a firewall is not lifted, but the sender has the VPC data platform in their organization's data sharing deployment location database, then the message should be blocked.

Figure 9:
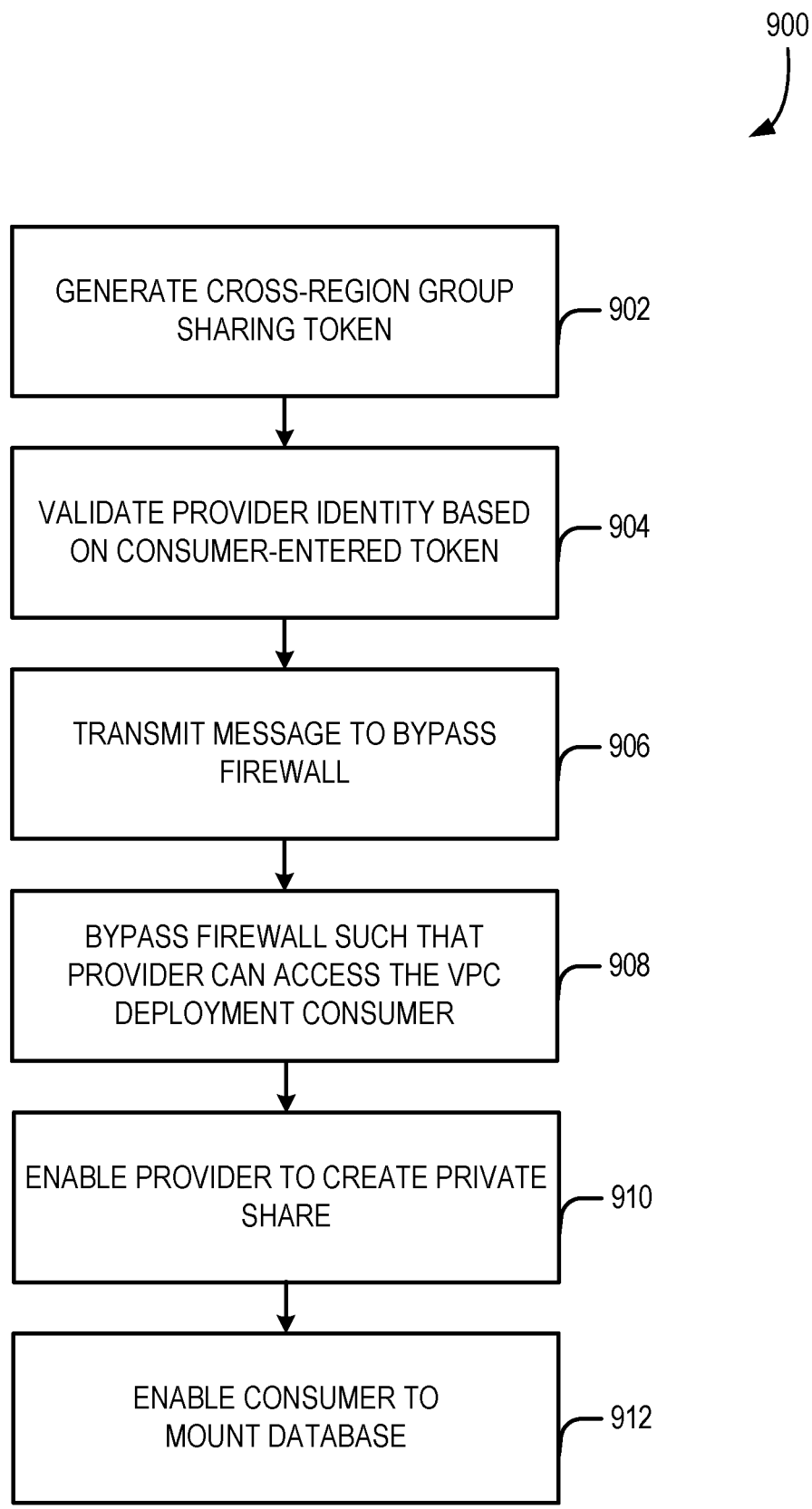
FIG. 9 shows an example flow diagram of an example method of data sharing, in accordance with some examples.

FIG. 9 shows a flow diagram of a method 900 for sharing data, in accordance with some example embodiments. The method 900 can be embodied in machine-readable instructions for execution by one or more hardware components (e.g., one or more processors, one or more hardware processors) such that the operations of the method 900 can be performed by components of the systems depicted in FIG. 1, FIG. 4, and/or FIG. 12, such as the cloud data platform 102. Accordingly, the method 900 is described below, by way of example with reference to components of the cloud data platform 102. However, it shall be appreciated that method 900 can be deployed on various other hardware configurations and is not intended to be limited to deployment within the hardware of examples presented herein.

Depending on the example embodiment, an operation of the method 900 can be repeated in different ways or involve intervening operations not shown. Though the operations of method 900 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

At operation 902, the cloud data platform 102 generates a cross-region group sharing token. For example, an offline provider runs a getToken( ) function and provides the result to the VPC data platform consumer. From operation 902, the method 900 flows to operation 904 for validating, by the cloud data platform 102, the token and validating the provider identity. From operation 904, the method 900 flows to operation 906 for transmitting one or more messages to bypass a firewall. From operation 906, the method 900 flows to operation 908, where the firewall is bypassed, such that the provider can access the VPC data platform (e.g., consumer side data).

From operation 908, the method 900 flows to operation 910, enabling, by the cloud data platform 102, the provider to create a private share (e.g., data sharing). From operation 910, the method 900 flows to operation 912, for enabling, by the cloud data platform 102, the consumer to mount the database. For example, a party that wants to be 'allow-listed,' generates a token that will provide both parties' (e.g., sender and receiver) information. When the receiving party accepts the token, that token will allow both parties to agree to the relationship establishment procedure by generating the token and the second party accepting the token. Then both parties involved are known and validated, and the cloud data platform can provide that information on an allow list such that the two parties can engage in secure data sharing.

Further example embodiments provide that any private provider in a provider organization can initiate, start, and/or create a private listing and target (e.g., aim for) one or more specific VPC data platforms (e.g., VPC deployments). The provider can elect or decide to specifically target a consumer using a private listing, where a specific account, set of accounts, or deployments can be targeted using personalized listing or targeted listings. Where targeting includes providing listing to the specific group of consumers most likely to want the provider's data. For example, an account that shares data may be referred to herein as a "sharer account" and an account with which the data is shared may be referred to herein as a "target account." A call from a VPC data platform consumer (e.g., a request from a requesting user) can modify an internal field on a provider's (e.g., a receiving user) data persistence object (DPO). For example, such as how metadata objects are stored in a database (e.g., a key-value store of a global metadata query engine of the compute service manager 108 or resource manager 422).

Additionally, and in accordance with some example embodiments, traffic is encrypted using internal message keys to efficiently transfer the traffic between the databases at different deployments. In some examples, a replication manager can generate the messages and/or keys at the database application level without requiring changes to a given VPC, HSM, or VPN node transfer network. For example, in some example embodiments, the traffic is sent in a sequence of messages using a pre-configured key encryption structure. In some example embodiments, in each message, the data is encrypted by a symmetric key (e.g., data encryption key (DEK) unique to that message). The data encryption key for the given message can be further encrypted by a wrapping replication key (WRK), which can be another symmetric key generated by the sending deployment. In some example embodiments, the WRK is then encrypted by a key from a keypair, such as the public key of the destination deployment. In some example embodiments, the encrypted WRK to access a DEK in a given message is also stored in the given message. In other example embodiments, the WRKs are staggered between messages such that a given message DEK is encrypted using a previously sent WRK (e.g., a WRK sent in a previously received message). Further, in some example embodiments, the WRKs are rotated based on time expiration periods or randomly to increase security of the data. In this way, a provider of the database systems (e.g., database applications running on VPNs) can efficiently and securely share data with and between different consumers.

Figure 10:
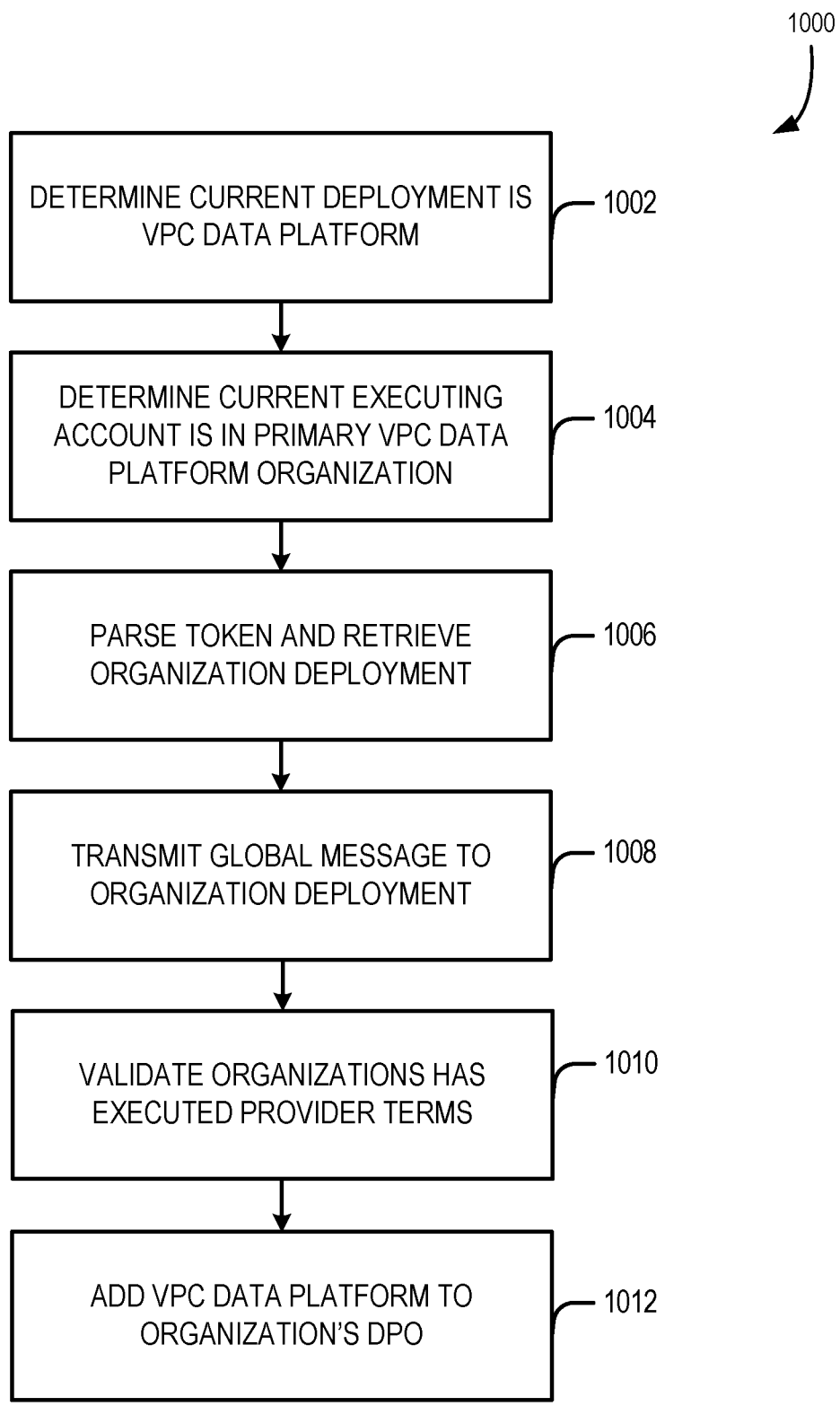
FIG. 10 shows a flow diagram of an example method for data sharing into a VPC data platform consumer interface, in accordance with some examples.

FIG. 10 shows a flow diagram of a method 1000 for enabling a virtual private cloud (VPC) deployment consumer to allow a provider organization to share data into the VPC deployment of the consumer, in accordance with some example embodiments. The method 1000 can be embodied in machine-readable instructions for execution by one or more hardware components (e.g., one or more processors, one or more hardware processors) such that the operations of the method 1000 can be performed by components of the systems depicted in FIG. 1, FIG. 4, and/or FIG. 12, such as the cloud data platform 102. Accordingly, the method 1000 is described below, by way of example with reference to components of the cloud data platform 102. However, it shall be appreciated that method 1000 can be deployed on various other hardware configurations and is not intended to be limited to deployment within the hardware of examples presented herein. Depending on the example embodiment, an operation of the method 1000 can be repeated in different ways or involve intervening operations not shown. Though the operations of the method 1000 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

Operation 1002 is for determining, by the resource manager 422, if the current deployment is a VPC data platform. From operation 1002, the method 1000 flows to operation 1004 for determining, by the cloud data platform 102, if the current executing account is in a primary VPC data platform organization. From operation 1004, the method 1000 flows to operation 1006 for parsing, by the cloud data platform 102, the token and retrieving information associated with the organization deployment.

From operation 1006, the method 1000 flows to operation 1008 for transmitting, by the cloud data platform 102, a message to the organization deployment. For example, a global message is propagated or caused to be propagated that includes or contains, at least, an action and the organization identifier, and a VPC data platform identifier. From operation 1008, the method 1000 flows to operation 1010 for resolving, by the cloud data platform 102, the organization and validating that the organization has signed provider terms. From operation 1010, the method 1000 flows to operation 1012 for adding, by the cloud data platform 102, the VPC data platform to the organization's data persistence object.

Figure 11:
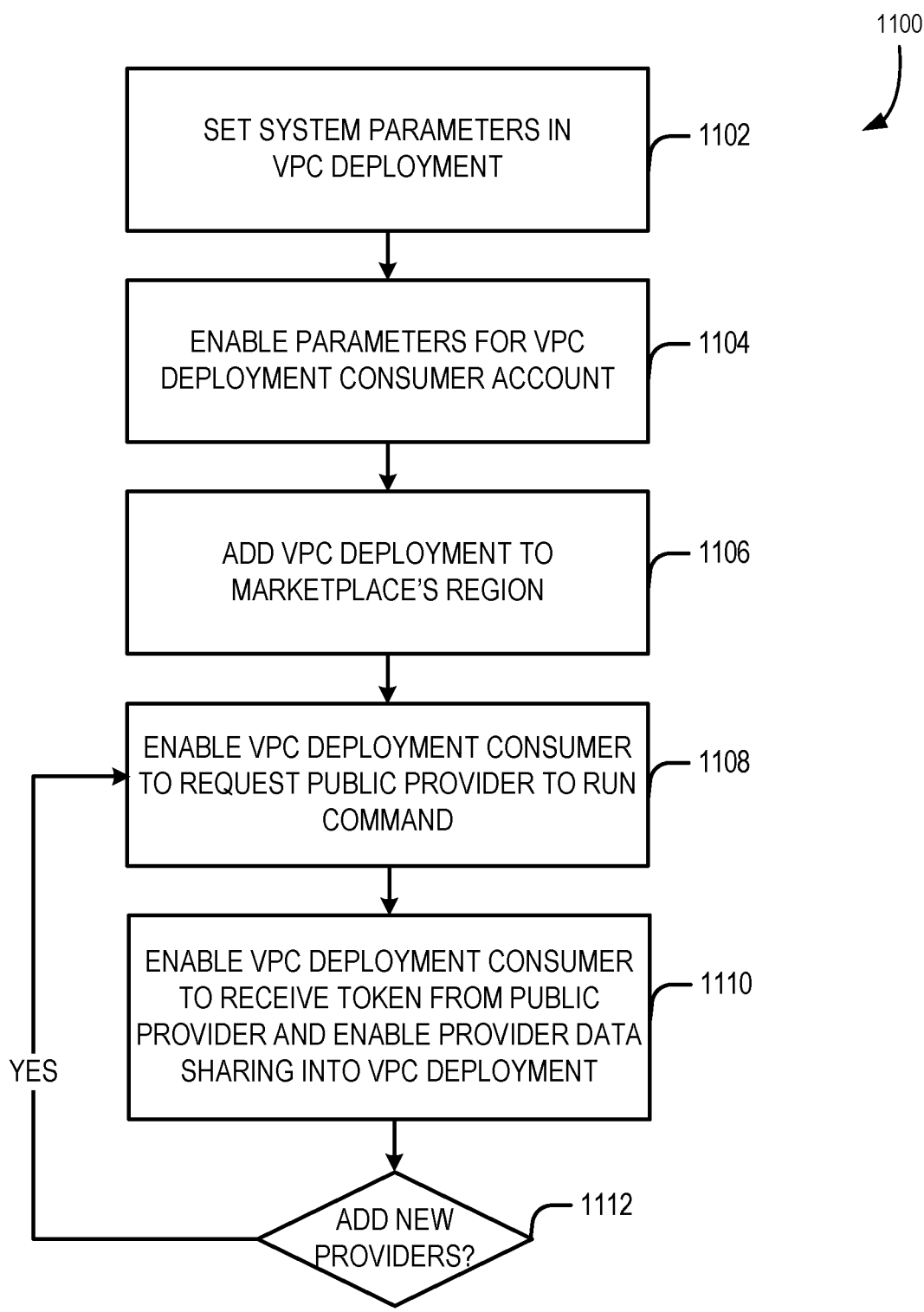
FIG. 11 shows a flow diagram of an example method for data sharing, in accordance with some examples.

FIG. 11 shows a flow diagram of a method 1100 for enabling providers to be added into an organization's data sharing deployment location for secure data sharing, in accordance with some example embodiments. The method 1100 can be embodied in machine-readable instructions for execution by one or more hardware components (e.g., one or more processors, one or more hardware processors) such that the operations of the method 1100 can be performed by components of the systems depicted in FIG. 1, FIG. 4, and/or FIG. 12, such as the cloud data platform 102. Accordingly, the method 1100 is described below, by way of example with reference to components of the cloud data platform 102. However, it shall be appreciated that method 1100 can be deployed on various other hardware configurations and is not intended to be limited to deployment within the hardware of examples presented herein.

Depending on the example embodiment, an operation of the method 1100 can be repeated in different ways or involve intervening operations not shown. Though the operations of the method 1100 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

Operation 1102 is for setting, by the cloud data platform 102, system parameters in a virtual private cloud (VPC) deployment. From operation 1102, the method 1100 flows to operation 1104 for enabling, by the cloud data platform 102, parameters for the VPC deployment consumer account. From operation 1104, the method 1100 flows to operation 1106 for enabling, by the cloud data platform 102, the VPC deployment to be added to the cloud data platform's marketplace region. From operation 11006, the method 1100 flows to operation 1108 for enabling, by the cloud data platform 102, the VPC deployment consumer to request a public provider to run a command. From operation 1108, the method 1100 flows to operation 1110 for enabling, by the cloud data platform 102, the VPC deployment consumer to receive a token from the public provider in order to enable provider data sharing into the VPC deployment. From operation 1110, the method 1100 flows to operation 1112 for determining, by the cloud data platform 102, if there are additional providers to add to the cloud data platform's marketplace region. If yes, there are more providers to add, the method 1100 flows back to operation 1108.

In additional example embodiments of FIGS. 9-11, the methods 900, 1000, and/or 1100 can be performed for automating secured data sharing from a public region to a private region and, in reverse, from a private region to a public region. For example, the cloud data platform 102 or components thereof can enable a provider in a VPC deployment region group to share data into a public region by facilitating (e.g., recording) an offline synchronization between one or more providers and one or more consumers to decide what dataset(s) the consumer wants and what dataset(s) the provider can provider. Then the method(s) can allow for the VPC deployment provider to make one or more listings of the VPC deployment provider available (e.g., visible) to the consumer; in other words, the consumer(s) in public region(s) cannot see (e.g., lack visibility) VPC deployment provider listings until the provider makes those listings available. The method(s) can further allow the VPC deployment owners to decide whom to share data within the public region(s). The method(s) can further enable the firewall for the VPC deployment to the public region(s) to be lifted in order to allow providers to share data with any consumer in the public region following the relationship establishment procedure. Last, the method(s) can further allow the VPC deployment provider to block public listings within the public region as a visible region.

Another general aspect is for a system that includes a memory comprising instructions and one or more computer processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

Described implementations of the subject matter can include one or more features, alone or in combination as illustrated below by way of example.

Example 1 is a method comprising: determining, by one or more hardware processors, that a relationship establishment procedure between a provider and a consumer is recorded with a cloud data platform, the provider being associated with a private cloud deployment and the consumer being associated with a public cloud deployment in a public region; and in response to determining that the relationship establishment procedure is recorded with the cloud data platform: disabling, by the one or more hardware processors, a firewall policy that is preventing data traffic between the private cloud deployment and the public cloud deployment; enabling, by the one or more hardware processors, data sharing between the private cloud deployment and the public cloud deployment; and enabling, by the one or more hardware processors, the data sharing in a database of the cloud data platform.

In Example 2, the subject matter of Example 1 optionally includes, wherein the private cloud deployment is a virtual private cloud deployment in a first region designated as a private region and the public cloud deployment is a public multi-tenant cloud deployment in a second region designated as a public multi-tenant region.

In Example 3, the subject matter of any one of Examples 1-2 optionally includes, wherein the disabling of the firewall policy comprises: generating, in a state cache of the database, a cross-region group sharing token; and validating the cross-region group sharing token.

In Example 4, the subject matter of any one of Examples 1-3 optionally includes, wherein the disabling of the firewall policy comprises: receiving, by the cloud data platform, a message from the provider to disable the firewall policy; and enabling the data sharing from the private cloud deployment to the public cloud deployment.

In Example 5, the subject matter of any one of Examples 1-4 optionally includes, wherein the relationship establishment procedure is initiated by the provider of the private cloud deployment.

In Example 6, the subject matter of any one of Examples 2-5 optionally includes, wherein the disabling of the firewall policy is performed only once to enable the provider to share data with any consumer in the public multi-tenant region.

In Example 7, the subject matter of Example 6 optionally includes, enabling the provider to grant permission to users of the cloud data platform to share the data in the public multi-tenant region.

In Example 8, the subject matter of any one of Examples 1-7 optionally includes, enabling, the provider, a privilege to disable the firewall policy to allow inbound listings to and outbound listings from a private cloud deployment region.

In Example 9, the subject matter of any one of Examples 1-8 optionally includes, enabling the provider in the private cloud deployment to target any consumer in a consumer organization.

In Example 10, the subject matter of any one of Examples 1-9 optionally includes, blocking a public listing, for the provider in the private cloud deployment, when the public region is set as a visible region.

Example 11 is a system comprising: one or more hardware processors of a machine; and at least one memory storing instructions that, when executed by the one or more hardware processors, cause the system to perform operations comprising: determining, by one or more hardware processors, that a relationship establishment procedure between a provider and a consumer is recorded with a cloud data platform, the provider being associated with a private cloud deployment and the consumer being associated with a public cloud deployment in a public region; and in response to determining that the relationship establishment procedure is recorded with the cloud data platform: disabling, by the one or more hardware processors, a firewall policy that is preventing data traffic between the private cloud deployment and the public cloud deployment; enabling, by the one or more hardware processors, data sharing between the private cloud deployment and the public cloud deployment; and enabling, by the one or more hardware processors, the data sharing in a database of the cloud data platform.

In Example 12, the subject matter of Example 11 optionally includes, wherein the private cloud deployment is a virtual private cloud deployment in a first region designated as a private region and the public cloud deployment is a public multi-tenant cloud deployment in a second region designated as a public multi-tenant region.

In Example 13, the subject matter of any one of Examples 11-12 optionally includes, wherein the disabling of the firewall policy comprises: generating, in a state cache of the database, a cross-region group sharing token; and validating the cross-region group sharing token.

In Example 14, the subject matter of any one of Examples 11-13 optionally includes, wherein the disabling of the firewall policy comprises: receiving, by the cloud data platform, a message from the provider to disable the firewall policy; and enabling the data sharing from the private cloud deployment to the public cloud deployment.

In Example 15, the subject matter of any one of Examples 11-14 optionally includes, wherein the relationship establishment procedure is initiated by the provider of the private cloud deployment.

In Example 16, the subject matter of any one of Examples 12-15 optionally includes, wherein the disabling of the firewall policy is performed only once to enable the provider to share data with any consumer in the public multi-tenant region.

In Example 17, the subject matter of Example 16 optionally includes, wherein the operations comprise: enabling the provider to grant permission to users of the cloud data platform to share the data in the public multi-tenant region.

In Example 18, the subject matter of any one of Examples 11-17 optionally includes, wherein the operations comprise: enabling, the provider, a privilege to disable the firewall policy to allow inbound listings to and outbound listings from a private cloud deployment region.

In Example 19, the subject matter of any one of Examples 11-18 optionally includes, wherein the operations comprise: enabling the provider in the private cloud deployment to target any consumer in a consumer organization.

In Example 20, the subject matter of any one of Examples 11-19 optionally includes, wherein the operations comprise: blocking a public listing, for the provider in the private cloud deployment, when the public region is set as a visible region.

Example 21 is a machine-readable storage device embodying instructions that, when executed by a machine, cause the machine to perform operations comprising: determining, by one or more hardware processors, that a relationship establishment procedure between a provider and a consumer is recorded with a cloud data platform, the provider being associated with a private cloud deployment and the consumer being associated with a public cloud deployment in a public region; and in response to determining that the relationship establishment procedure is recorded with the cloud data platform: disabling, by the one or more hardware processors, a firewall policy that is preventing data traffic between the private cloud deployment and the public cloud deployment; enabling, by the one or more hardware processors, data sharing between the private cloud deployment and the public cloud deployment; and enabling, by the one or more hardware processors, the data sharing in a database of the cloud data platform.

In Example 22, the subject matter of Example 21 optionally includes, wherein the private cloud deployment is a virtual private cloud deployment in a first region designated as a private region and the public cloud deployment is a public multi-tenant cloud deployment in a second region designated as a public multi-tenant region.

In Example 23, the subject matter of any one of Examples 21-22 optionally includes, wherein the disabling of the firewall policy comprises: generating, in a state cache of the database, a cross-region group sharing token; and validating the cross-region group sharing token.

In Example 24, the subject matter of any one of Examples 21-23 optionally includes, wherein the disabling of the firewall policy comprises: receiving, by the cloud data platform, a message from the provider to disable the firewall policy; and enabling the data sharing from the private cloud deployment to the public cloud deployment.

In Example 25, the subject matter of any one of Examples 21-24 optionally includes, wherein the relationship establishment procedure is initiated by the provider of the private cloud deployment.

In Example 26, the subject matter of any one of Examples 22-25 optionally includes, wherein the disabling of the firewall policy is performed only once to enable the provider to share data with any consumer in the public multi-tenant region.

In Example 27, the subject matter of Example 26 optionally includes, wherein the operations comprise: enabling the provider to grant permission to users of the cloud data platform to share the data in the public multi-tenant region.

In Example 28, the subject matter of any one of Examples 21-27 optionally includes, wherein the operations comprise: enabling, the provider, a privilege to disable the firewall policy to allow inbound listings to and outbound listings from a private cloud deployment region.

In Example 29, the subject matter of any one of Examples 21-28 optionally includes, wherein the operations comprise: enabling the provider in the private cloud deployment to target any consumer in a consumer organization.

In Example 30, the subject matter of any one of Examples 21-29 optionally includes, wherein the operations comprise: blocking a public listing, for the provider in the private cloud deployment, when the public region is set as a visible region.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Figure 12:
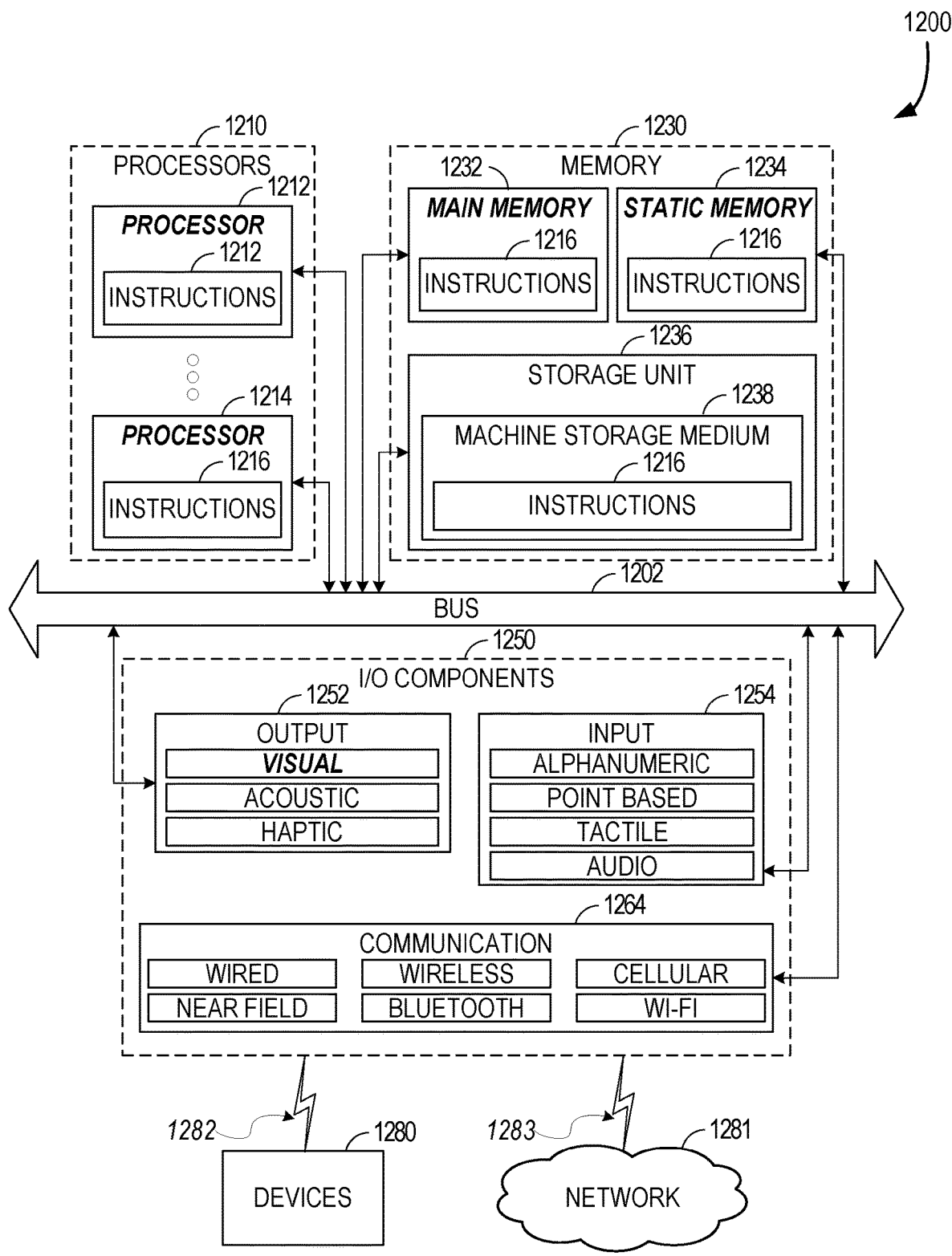
FIG. 12 illustrates a diagrammatic representation of an example machine in the form of a computer system within which a set of instructions may be executed for causing the machine to perform any one or more of the methodologies discussed herein, in accordance with some examples.

FIG. 12 illustrates a diagrammatic representation of a machine 1200 in the form of a computer system within which a set of instructions can be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. For example, the instructions 1216 can cause the machine 1200 to execute any one or more operations of any one or more of the methods described herein. As another example, the instructions 1216 can cause the machine 1200 to implement portions of the data flows described herein. In this way, the instructions 1216 transform a general, non-programmed machine into a particular machine 1200 that is specially configured to carry out any one of the described and illustrated functions in the manner described herein.

In alternative embodiments, the machine 1200 operates as a standalone device or can be coupled (e.g., networked) to other machines. In a networked deployment, the machine 1200 can operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for example, a processor 1212 and a processor 1214 that can execute the instructions 1216. The term "processor" is intended to include multi-core processors 1210 that can comprise two or more independent processors (sometimes referred to as "cores") that can execute instructions 1216 contemporaneously. Although FIG. 12 shows multiple processors 1210, the machine 1200 can include a single processor with a single core, a single processor with multiple cores (e.g., a multi-core processor), multiple processors with a single core, multiple processors with multiple cores, or any combination thereof.

The memory 1230 can include a main memory 1232, a static memory 1234, and a storage unit 1236, all accessible to the processors 1210 such as via the bus 1202. The main memory 1232, the static memory 1234, and the storage unit 1236 comprising a machine storage medium 1238 can store the instructions 1216 embodying any one or more of the methodologies or functions described herein. The instructions 1216 can also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 can include many other components that are not shown in FIG. 12. The I/O components 1250 are grouped according to functionality merely for simplifying the following discussion and the grouping is in no way limiting. In various example embodiments, the I/O components 1250 can include output components 1252 and input components 1254. The output components 1252 can include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1250 can include communication components 1264 operable to couple the machine 1200 to a network 1281 via a coupler 1283 or to devices 1280 via a coupling 1282. For example, the communication components 1264 can include a network interface component or another suitable device to interface with the network 1281. In further examples, the communication components 1264 can include wired communication components, wireless communication components, cellular communication components, and other communication components to provide communication via other modalities. The devices 1280 can be another machine or any of a wide variety of peripheral devices (e.g., a peripheral device coupled via a universal serial bus (USB)).

The various memories (e.g., 1230, 1232, 1234, and/or memory of the processor(s) 1210 and/or the storage unit 1236) can store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, for example, erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1281 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1281 or a portion of the network 1281 can include a wireless or cellular network, and the coupling 1282 can be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G), Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 can be transmitted or received over the network 1281 using a transmission medium via a network interface device (e.g., a network interface component included in the communication components 1264) and utilizing any one of a number of well-known transfer protocols (e.g., hypertext transfer protocol (HTTP)). Similarly, the instructions 1216 can be transmitted or received using a transmission medium via the coupling 1282 (e.g., a peer-to-peer coupling) to the devices 1280. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," "non-transitory computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

As described herein, one or more embodiments of the present disclosure take the form of methods that include multiple operations. One or more other embodiments take the form of systems (e.g., data platforms) that include at least one hardware processor and that also include one or more computer-storage media containing instructions that, when executed by the at least one hardware processor, cause the at least one hardware processor to perform multiple operations (that may or may not correspond to operations performed in a herein-disclosed method embodiment). Still one or more other embodiments take the form of one or more computer-storage media containing instructions that, when executed by at least one hardware processor (e.g., a data platform), cause the at least one hardware processor to perform multiple operations (that, again, may or may not correspond to operations performed in a herein-disclosed method embodiment and/or operations performed by a herein-disclosed system embodiment).

Various additional embodiments and combinations and permutations thereof are described below in connection with the various figures. Any embodiment, combination, variation, permutation, or the like that is described in this disclosure can be implemented with respect to any type of embodiment. For example, a variation or permutation that is primarily described in this disclosure in connection with a method embodiment could just as well be implemented in connection with a system embodiment (e.g., a data-platform embodiment), a computer-storage-medium embodiment, and/or one or more other types of embodiments. Furthermore, this flexibility and cross-applicability of embodiments is present despite the use herein of any slightly different language (e.g., processes, methods, methodologies, steps, operations, functions, etc.) to describe and/or characterize such embodiments and/or any element or elements thereof.

The description presented herein includes systems, methods, techniques, instruction sequences, and computing machine program products that embody illustrative embodiments of the disclosure. In the previous description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The description presented herein describes systems, methods, techniques, instruction sequences, and computing machine program products that illustrate example embodiments of the present subject matter. In the description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

What is claimed is:

1. A method comprising:
   determining, by one or more hardware processors, that a relationship establishment procedure between a provider and a consumer is recorded with a cloud data platform, the provider being associated with a private cloud deployment and the consumer being associated with a public cloud deployment in a public region, the private cloud deployment comprising a virtualized environment running on dedicated hardware instances of the cloud data platform; and
   in response to determining that the relationship establishment procedure is recorded with the cloud data platform:
      providing, in the private cloud deployment, a parameter to enable or disable a region where a listing is visible;
      disabling a firewall policy that is preventing data traffic between the private cloud deployment and the public cloud deployment, the firewall policy blocking the listing from being visible in the region;
      enabling data sharing associated with the listing between the private cloud deployment in a private region and the public cloud deployment in a public multi-tenant region; and
      enabling the data sharing in a database of the cloud data platform, the data sharing including database replication to the virtualized environment based on the listing.

2. The method of claim 1, wherein the private cloud deployment is a virtual private cloud deployment in a first region designated as the private region and the public cloud deployment is the public multi-tenant cloud deployment in a second region designated as a public multi-tenant region.

3. The method of claim 2, wherein the disabling of the firewall policy is performed only once to enable the provider to share data with any consumer in the public multi-tenant region.

4. The method of claim 3, comprising:
   enabling the provider to grant permission to users of the cloud data platform to share the data in the public multi-tenant region.

5. The method of claim 1, wherein the disabling of the firewall policy comprises:
   generating, in a state cache of the database, a cross-region group sharing token; and
   validating the cross-region group sharing token.

6. The method of claim 1, wherein the disabling of the firewall policy comprises:
   receiving, by the cloud data platform, a message from the provider to disable the firewall policy; and
   enabling the data sharing from the private cloud deployment to the public cloud deployment.

7. The method of claim 1, wherein the relationship establishment procedure is initiated by the provider of the private cloud deployment.

8. The method of claim 1, comprising:
   enabling, the provider, a privilege to disable the firewall policy to allow inbound listings to and outbound listings from a private cloud deployment region.

9. The method of claim 1, comprising:
   enabling the provider in the private cloud deployment to target any consumer in a consumer organization.

10. The method of claim 1, comprising:
    blocking a public listing, for the provider in the private cloud deployment, when the public region is set as a visible region.

11. A system comprising:
    one or more hardware processors of a machine; and
    at least one memory storing instructions that, when executed by the one or more hardware processors, cause the system to perform operations comprising:
       determining, by one or more hardware processors, that a relationship establishment procedure between a provider and a consumer is recorded with a cloud data platform, the provider being associated with a private cloud deployment and the consumer being associated with a public cloud deployment in a public region, the private cloud deployment comprising a virtualized environment running on dedicated hardware instances of the cloud data platform; and
       in response to determining that the relationship establishment procedure is recorded with the cloud data platform:
          providing, in the private cloud deployment, a parameter to enable or disable a region where a listing is visible;
          disabling a firewall policy that is preventing data traffic between the private cloud deployment and the public cloud deployment, the firewall policy blocking the listing from being visible in the region;

enabling data sharing associated with the listing between the private cloud deployment in a private region and the public cloud deployment in a public multi-tenant region; and enabling the data sharing in a database of the cloud data platform, the data sharing including database replication to the virtualized environment based on the listing.

12. The system of claim 11, wherein the private cloud deployment is a virtual private cloud deployment in a first region designated as the private region and the public cloud deployment is a public multi-tenant cloud deployment in a second region designated as the public multi-tenant region.

13. The system of claim 12, wherein the disabling of the firewall policy is performed only once to enable the provider to share data with any consumer in the public multi-tenant region.

14. The system of claim 13, wherein the operations comprise:
enabling the provider to grant permission to users of the cloud data platform to share the data in the public multi-tenant region.

15. The system of claim 11, wherein the disabling of the firewall policy comprises:
generating, in a state cache of the database, a cross-region group sharing token; and
validating the cross-region group sharing token.

16. The system of claim 11, wherein the disabling of the firewall policy comprises:
receiving, by the cloud data platform, a message from the provider to disable the firewall policy; and
enabling the data sharing from the private cloud deployment to the public cloud deployment.

17. The system of claim 11, wherein the relationship establishment procedure is initiated by the provider of the private cloud deployment.

18. The system of claim 11, wherein the operations comprise:
enabling, the provider, a privilege to disable the firewall policy to allow inbound listings to and outbound listings from a private cloud deployment region.

19. The system of claim 11, wherein the operations comprise:
enabling the provider in the private cloud deployment to target any consumer in a consumer organization.

20. The system of claim 11, wherein the operations comprise:
blocking a public listing, for the provider in the private cloud deployment, when the public region is set as a visible region.

21. A machine-readable storage device embodying instructions that, when executed by a machine, cause the machine to perform operations comprising:
determining, by one or more hardware processors, that a relationship establishment procedure between a provider and a consumer is recorded with a cloud data platform, the provider being associated with a private cloud deployment and the consumer being associated with a public cloud deployment in a public region, the private cloud deployment comprising a virtualized environment running on dedicated hardware instances of the cloud data platform; and
in response to determining that the relationship establishment procedure is recorded with the cloud data platform:
providing, in the private cloud deployment, a parameter to enable or disable a region where a listing is visible;
disabling a firewall policy that is preventing data traffic between the private cloud deployment and the public cloud deployment, the firewall policy blocking the listing from being visible in the region;
enabling data sharing associated with the listing between the private cloud deployment in a private region and the public cloud deployment in a public multi-tenant region; and
enabling the data sharing in a database of the cloud data platform, the data sharing including database replication to the virtualized environment based on the listing.

22. The machine-readable storage device of claim 21, wherein the private cloud deployment is a virtual private cloud deployment in a first region designated as the private region and the public cloud deployment is a public multi-tenant cloud deployment in a second region designated as the public multi-tenant region.

23. The machine-readable storage device of claim 22, wherein the disabling of the firewall policy is performed only once to enable the provider to share data with any consumer in the public multi-tenant region.

24. The machine-readable storage device of claim 23, wherein the operations comprise:
enabling the provider to grant permission to users of the cloud data platform to share the data in the public multi-tenant region.

25. The machine-readable storage device of claim 21, wherein the disabling of the firewall policy comprises:
generating, in a state cache of the database, a cross-region group sharing token; and
validating the cross-region group sharing token.

26. The machine-readable storage device of claim 21, wherein the disabling of the firewall policy comprises:
receiving, by the cloud data platform, a message from the provider to disable the firewall policy; and
enabling the data sharing from the private cloud deployment to the public cloud deployment.

27. The machine-readable storage device of claim 21, wherein the relationship establishment procedure is initiated by the provider of the private cloud deployment.

28. The machine-readable storage device of claim 21, wherein the operations comprise:
enabling, the provider, a privilege to disable the firewall policy to allow inbound listings to and outbound listings from a private cloud deployment region.

29. The machine-readable storage device of claim 21, wherein the operations comprise:
enabling the provider in the private cloud deployment to target any consumer in a consumer organization.

30. The machine-readable storage device of claim 21, wherein the operations comprise:
blocking a public listing, for the provider in the private cloud deployment, when the public region is set as a visible region.

\* \* \* \* \*